(12) United States Patent
Grau

(10) Patent No.: US 11,411,917 B2
(45) Date of Patent: *Aug. 9, 2022

(54) METHOD FOR DETECTING, BLOCKING AND REPORTING CYBER-ATTACKS AGAINST AUTOMOTIVE ELECTRONIC CONTROL UNITS

(71) Applicant: Sectigo, Inc., Roseland, NJ (US)

(72) Inventor: Alan Grau, Des Moines, IA (US)

(73) Assignee: Sectigo, Inc., Roseland, NJ (US)

(*) Notice: Subject to any disclaimer, the term of this patent is extended or adjusted under 35 U.S.C. 154(b) by 194 days.

This patent is subject to a terminal disclaimer.

(21) Appl. No.: 16/881,147

(22) Filed: May 22, 2020

(65) Prior Publication Data

US 2020/0287872 A1 Sep. 10, 2020

Related U.S. Application Data

(63) Continuation of application No. 15/746,079, filed as application No. PCT/US2016/045431 on Aug. 3, 2016, now Pat. No. 10,666,615.

(60) Provisional application No. 62/200,550, filed on Aug. 3, 2015.

(51) Int. Cl.
| | | |
|---|---|---|
| *H04L 29/06* | (2006.01) | |
| *H04L 9/40* | (2022.01) | |
| *G06F 21/55* | (2013.01) | |
| *H04L 67/125* | (2022.01) | |
| *B60R 25/30* | (2013.01) | |
| *B60R 25/00* | (2013.01) | |
| *H04L 12/40* | (2006.01) | |
| *H04L 12/66* | (2006.01) | |

(52) U.S. Cl.
CPC .......... *H04L 63/0236* (2013.01); *B60R 25/30* (2013.01); *G06F 21/554* (2013.01); *H04L 63/0209* (2013.01); *H04L 63/1441* (2013.01); *H04L 67/125* (2013.01); *B60R 25/00* (2013.01); *B60R 2325/106* (2013.01); *G06F 2221/2101* (2013.01); *H04L 12/40* (2013.01); *H04L 12/66* (2013.01); *H04L 63/1425* (2013.01)

(58) Field of Classification Search
CPC ............ H04L 63/0236; H04L 63/0209; H04L 63/1441; H04L 67/125; H04L 12/40; H04L 12/66; H04L 63/1425; G06F 21/554; G06F 2221/2101

See application file for complete search history.

(56) References Cited

U.S. PATENT DOCUMENTS

| | | | |
|---|---|---|---|
| 2011/0130906 A1* | 6/2011 | Mayer | .................... G07C 5/085 |
| | | | 903/903 |
| 2013/0104186 A1 | 4/2013 | Dietz et al. | |
| 2013/0145482 A1 | 6/2013 | Ricci et al. | |

(Continued)

OTHER PUBLICATIONS

Idrees, Muhammad Sabir, and Yves Roudier. "Effective and efficient security policy engines for automotive on-board networks." International Workshop on Communication Technologies for Vehicles. Springer, Berlin, Heidelberg, 2012. (Year: 2012).*

(Continued)

*Primary Examiner* — Shawnchoy Rahman
(74) *Attorney, Agent, or Firm* — Dentons Davis Brown, PC; Matthew Warner-Blankenship

(57) ABSTRACT

The disclosed apparatus, systems and methods relate to protecting automotive electronic control units from cyber-attacks.

20 Claims, 18 Drawing Sheets

(56) References Cited

U.S. PATENT DOCUMENTS

2014/0195808 A1    7/2014  Lortz et al.
2015/0020152 A1    1/2015  Litichever et al.
2015/0113638 A1    4/2015  Valasek et al.
2019/0332823 A1*  10/2019  Kwon ................. H04L 12/40

OTHER PUBLICATIONS

U. E. Larson, D. K. Nilsson and E. Jonsson, "An approach to specification-based attack detection for in-vehicle networks," 2008 IEEE Intelligent Vehicles Symposium, 2008, pp. 220-225, doi: 10.1109/IVS.2008.4621263. (Year: 2008).*

T. Gaska, "Assessing dual use embedded security for IMA," 2013 IEEE/AIAA 32nd Digital Avionics Systems Conference (DASC), 2013, pp. 4A2-1-4A2-19, doi: 10.1109/DASC.2013.6712576. (Year: 2013).*

* cited by examiner

METHOD FOR DETECTING, BLOCKING AND REPORTING CYBER-ATTACKS AGAINST AUTOMOTIVE ELECTRONIC CONTROL UNITS

CROSS-REFERENCE TO RELATED APPLICATION(S)

This application claims priority as a continuation to 35 U.S.C. § 371 U.S. application Ser. No. 15/746,079, filed on Jan. 19, 2018 and entitled "Method For Detecting, Blocking and Reporting Cyber-Attacks Against Automotive Electronic Control Units," which claims the benefit under 35 U.S.C. § 371 to International PCT Patent Application No. PCT/US16/45431, filed on Aug. 3, 2016, which claims priority to U.S. Provisional Patent Application No. 62/200,550, filed Aug. 3, 2015 and entitled "A Method For Detecting, Blocking And Reporting Cyber-Attacks Against Automotive Electronic Control Units," which is incorporated herein in its entirety by this reference.

TECHNICAL FIELD

This disclosure relates to automotive security, and more specifically, to devices, systems, and methods for protecting automotive electronic control units from cyber-attacks.

BACKGROUND

This disclosure relates to automotive security, and more specifically, to devices, systems, and methods for protecting automotive electronic control units from cyber-attacks.

An electronic control unit ("ECU") is a generic term for an embedded structure that controls one or more electrical structures or substructures within a transport vehicle. Due to the increasing complexity of automotive control schemes, to execute various vehicle control requirements ECUs must have the capability to connect to a number of external communication platforms. These external communication platforms include, for example, Wi-Fi, Ethernet, On-Board Diagnostics Generation Two (OBD-II), GPS, or Telematics. As each ECU in the automotive control scheme receives data packets from external communications platforms and internal sensors, it sends the data packets to a central network within the vehicle, composed of a vehicle bus or vehicle buses. Generally, automotive ECUs are composed of three main architectures. These architectures include (1) complex architectures, such as infotainment ECUs, (2) gateway architectures, which serve as a gateway between external communication platforms #3187097 and the vehicle bus or vehicle buses, and (3) chain architectures, in which an automotive control scheme with multiple vehicle buses may forward data packets from one vehicle bus to another, for example an ECU forwarding data packets from a critical or operational vehicle bus to a non-critical vehicle bus. In a modern vehicle, two or even all three of these architectures may be present, and the same automotive control scheme may contain two or more complex architectures.

As a result of the nature of external communication platforms and the complexity of ECU architectures, automotive ECUs have become a target for cyber-attacks. Often, multiple supported external communication platforms are in communication with ECUs, which in turn have access to the central communications network within the automotive control scheme. While this interconnectivity produces desirable results for automobile consumers, it also creates a growing attack surface for hackers to exploit. The increasing vulnerability to attacks is further complicated by the complex ECU architectures, like infotainment ECUs. An infotainment ECU requires access to the vehicle bus to, for example, determine vehicle speed and thereby provide speed sensitive volume control, among other capabilities. Complex architectures use software systems such as Linux, Android and Java, which all provide rich attack vectors. Because the complex architectures provide direct access to the vehicle bus, a software vulnerability in the audio player of an infotainment ECU also creates the potential to use remote code execution to send attacks through the vehicle bus. This would allow hackers to exploit a variety of imperative functions within the automotive control scheme while the vehicle is in use, such as the antilock brakes or steering systems. Thus, there is a need in the art for improved methods and systems for protecting automotive ECUs from cyber-attacks.

BRIEF SUMMARY

Disclosed herein is a protection system used to protect automotive electronic control units from cyber-attacks. The presently disclosed protection system improves upon the prior art by adapting automobile ECU structures to relay data packets to the protection system, which is adapted to regulate and control these structures.

The protection system disclosed herein uses a processing system to control the flow of data packets from various automotive components. Depending upon the state of the vehicle (be it driving, parked, etc.), or the desire of the user (to use an infotainment component, for example), the data packets allow the ECU to control certain automotive control schemes. If the software on the ECU is compromised by an attack, such as a cyber-attack, breach, or other malfunction, or if the automotive control scheme is targeted by an attack over one of the external communication platforms in communication with the ECUs, the presently disclosed protection system will identify the attack as the data packet containing the attack is passed through the vehicle bus firewall. The vehicle bus firewall will then look up and select a filtering rule based on the state of the vehicle and the data packet identity, blocking any attacks to the automotive control scheme.

A system of one or more computers can be configured to perform particular operations or actions by virtue of having software, firmware, hardware, or a combination of each installed on the system. One or more computer programs can be configured to perform particular operations or actions by virtue of including instructions that, when executed by data processing apparatus, cause the apparatus to perform the actions.

Example 1 relates to a method of protecting ECU signaling from cyber-attacks originating within complex ECU processing.

Example 2 relates to a method of protecting single purpose ECU processing.

Example 3 relates to a method of protecting ECU signaling using CAN bridge/firewall processing.

Example 4 relates to a method of protecting ECU signaling from cyberattacks occurring via a Gateway ECU using CAN bus firewall processing.

Example 5 relates to a method for logging event notifications by a CAN firewall.

Other embodiments include corresponding computer systems, apparatus, and computer programs recorded on one or more computer storage devices, each configured to perform the actions of the disclosed protection systems.

While multiple embodiments, including various gateway, firewall, and ECU devices, systems, and methods are described herein as a "protection system," this is in no way intended to be restrictive. Additionally, while multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

The disclosed devices, systems, and methods relate to a protection system used to protect automotive electronic control units from cyber-attacks. Described herein are various embodiments relating to systems and methods for protecting various ECU processing functions. More specifically, the embodiments include methods, systems, and devices, for controlling the flow of the signals, or "messages" each ECU is allowed to send or to process. If the software on the ECU is compromised by an attack, such as a cyber-attack, breach, or other malfunction, the disclosed system will identify the attack as the data packet containing the attack is passed through the vehicle bus firewall. The vehicle bus firewall will look up and identify a filtering rule based on the data packet identity, and will block any attacks to the automotive control scheme. While multiple embodiments, including various gateway, firewall, and ECU devices, systems, and methods are described herein as "protection system," this is in no way intended to be restrictive.

Additionally, in various embodiments the term "vehicle bus" would be understood by a person of skill in the art to encompass any variety of vehicle bus systems. For example, common vehicle bus protocols may include, but are not limited to, CAN, LIN, and FlexRay.

Figure 1:
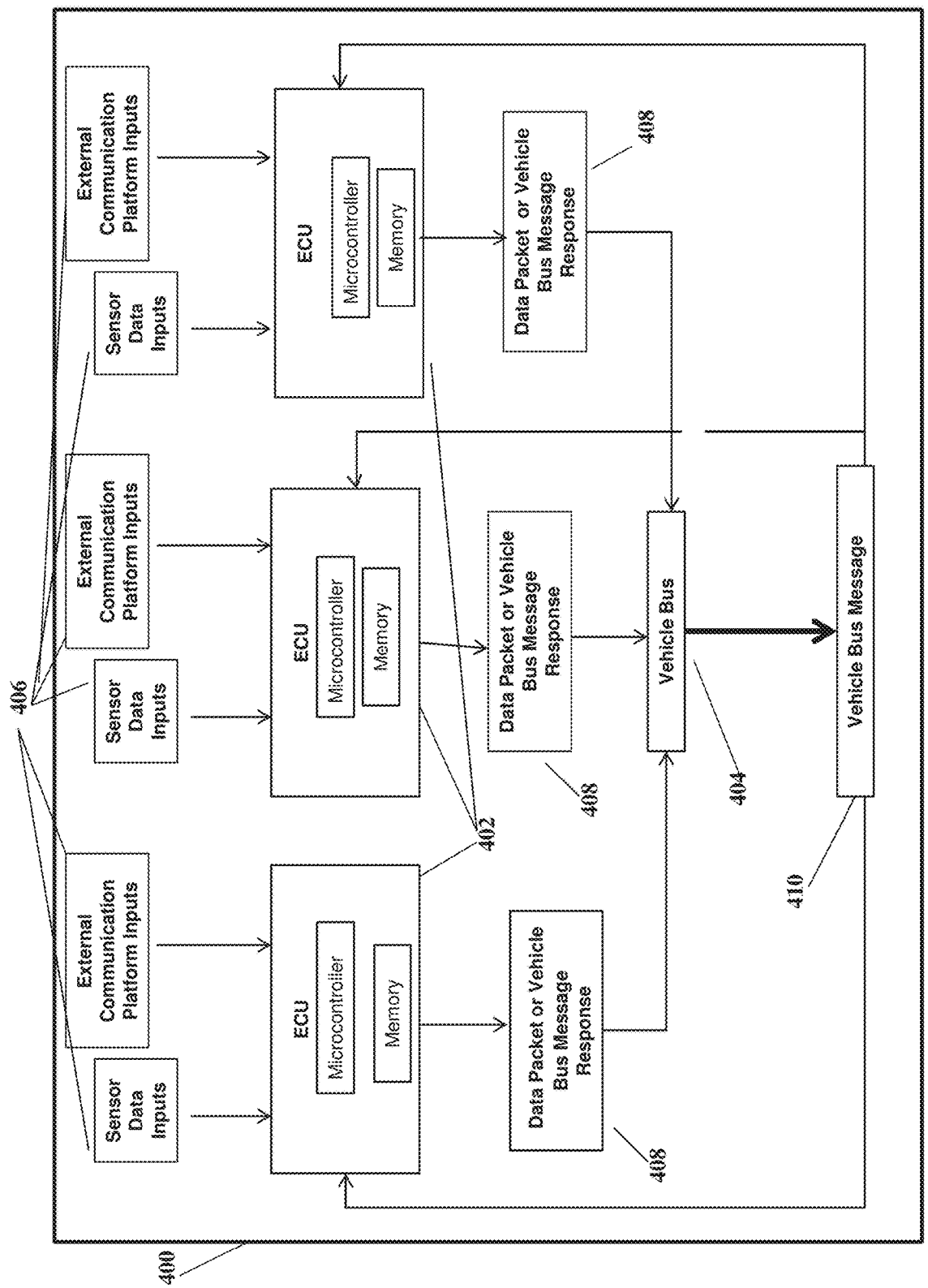
FIG. 1 is a schematic overview of an automotive control scheme
Figure 2:
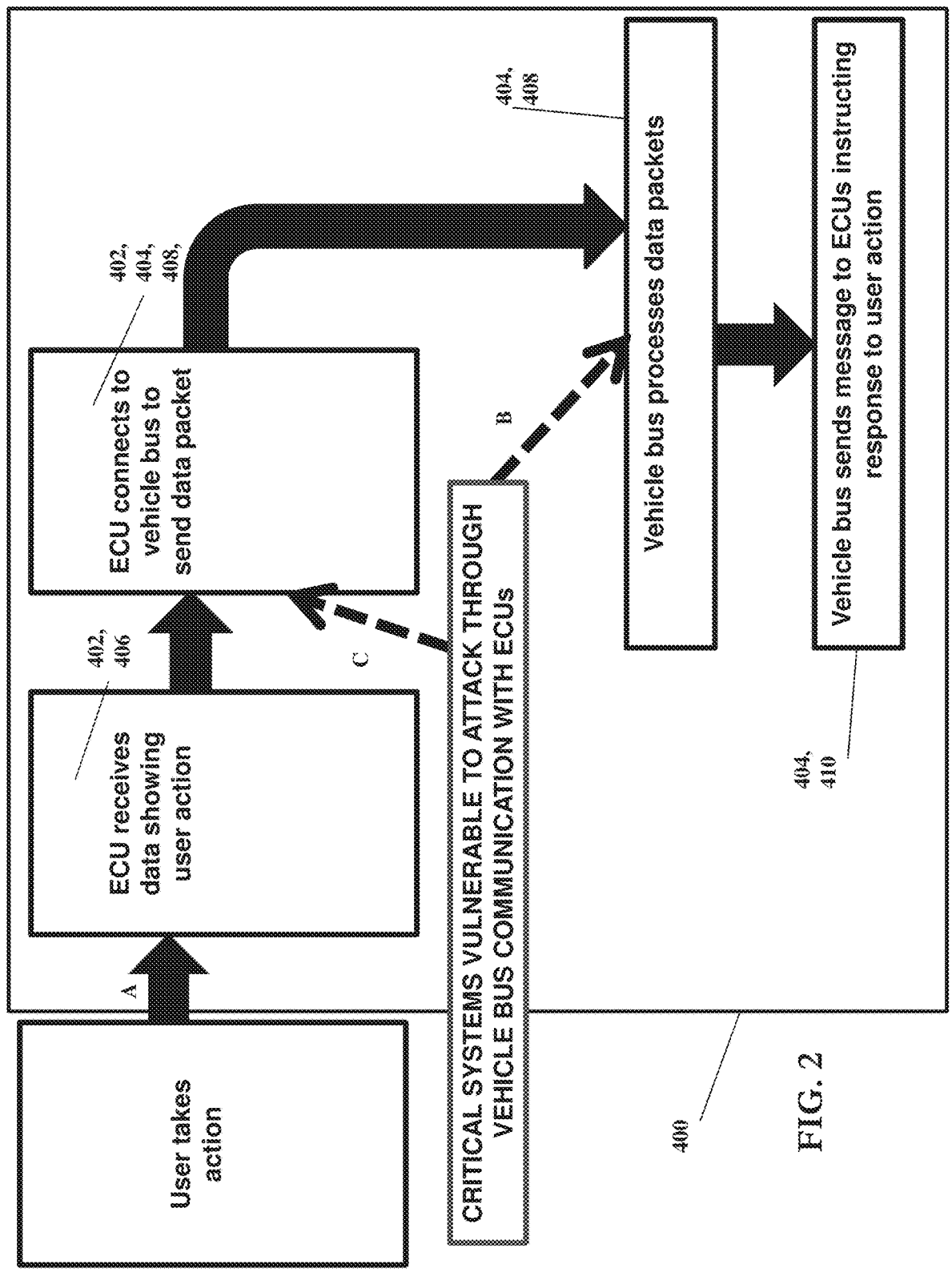
FIG. 2 is a schematic overview depicting automotive control scheme vulnerability prior to implementation of present invention

As shown in FIG. 1, a typical automotive control scheme 400 uses ECU 402 and vehicle bus 404 communication as the primary communication method. These processes can comprise a variety of optional steps. First, the ECU 402 receives inputs 406. The ECU processes the data in data packets 408. The data packets 408 are sent to the vehicle bus 404. The vehicles bus 404 receives the data packets 408 and sends a vehicle bus message 410 to each ECU 402 based on the data packet 408 and the function performed by that ECU. Vehicle bus messages 410 do not contain any address information, so when the ECU 402 receives the message 410 there is no way to identify which ECU 402 the message 410 came from or which ECU 402 was supposed to receive the message. As shown in FIG. 2, this creates a problem because the ECU 402 receiving the message 410 cannot distinguish between a message 410 that was the result of a valid data packet 408, created by a valid driver action (reference arrow A) (such as applying breaks), and a message sent as the result of an attack (reference arrow B).

Figure 3:
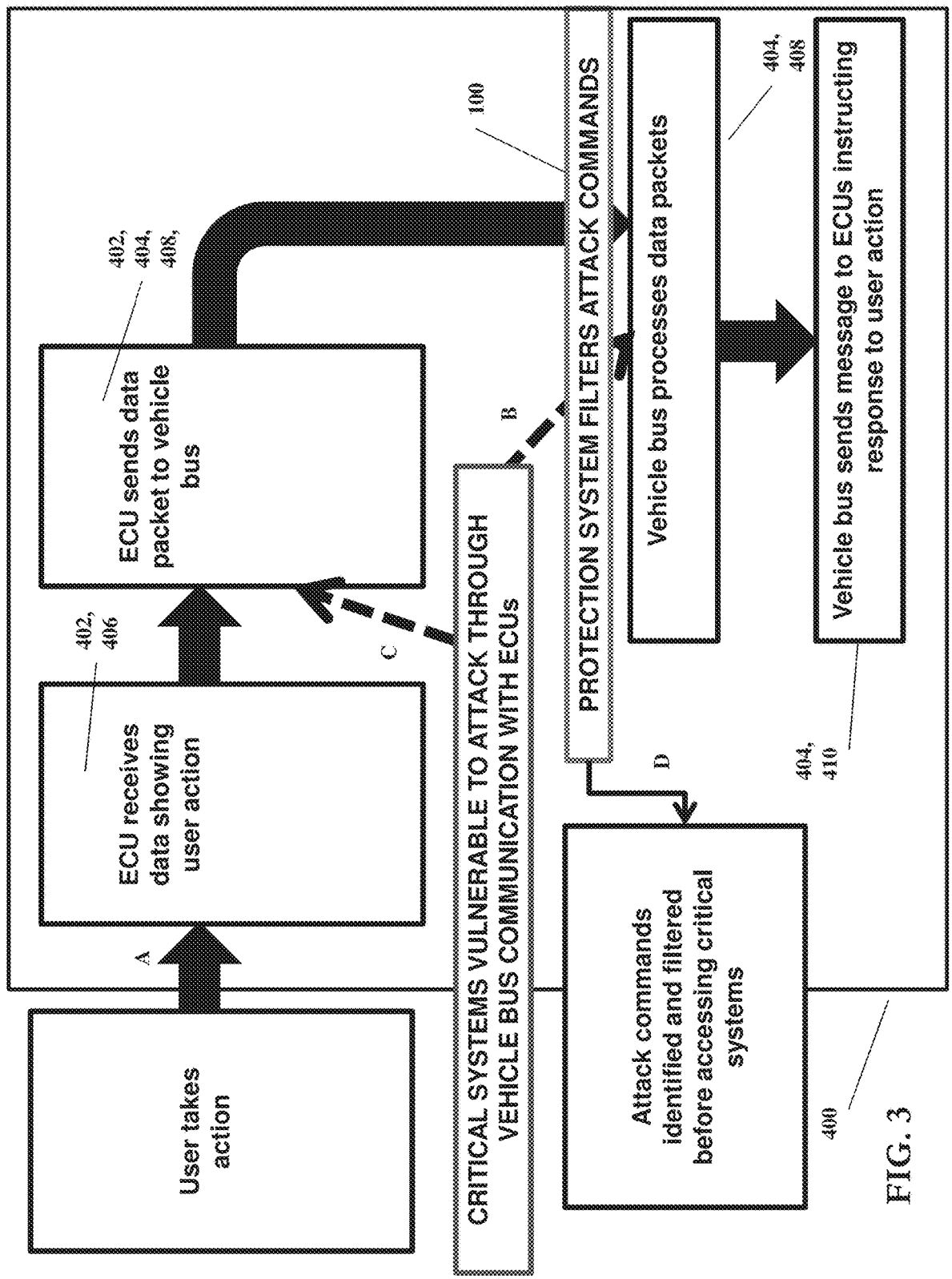
FIG. 3 is a schematic overview depicting an automotive control scheme with protection system in place.

Additionally, some ECUs 402 receive inputs 406 from external communication platforms, for example an OBD-II ECU. Inputs 406 from external communication platforms are sometimes desirable, for example when performing diagnostics the OBD-II port must use the vehicle bus 404 to send messages 410 through the vehicle. In other situations, however, inputs 406 from external communications platforms can be an attack (here, reference arrow C) instead of a valid input 406. In these situations, it is desirable to block inputs 406 from external communication platforms. As shown in FIG. 3, the disclosed protection system 100 identifies these attacks (reference arrows B, C) and filters them (shown at reference arrow D), preventing the attack commands from being sent to other ECUs through vehicle bus messages 410.

Figure 4:
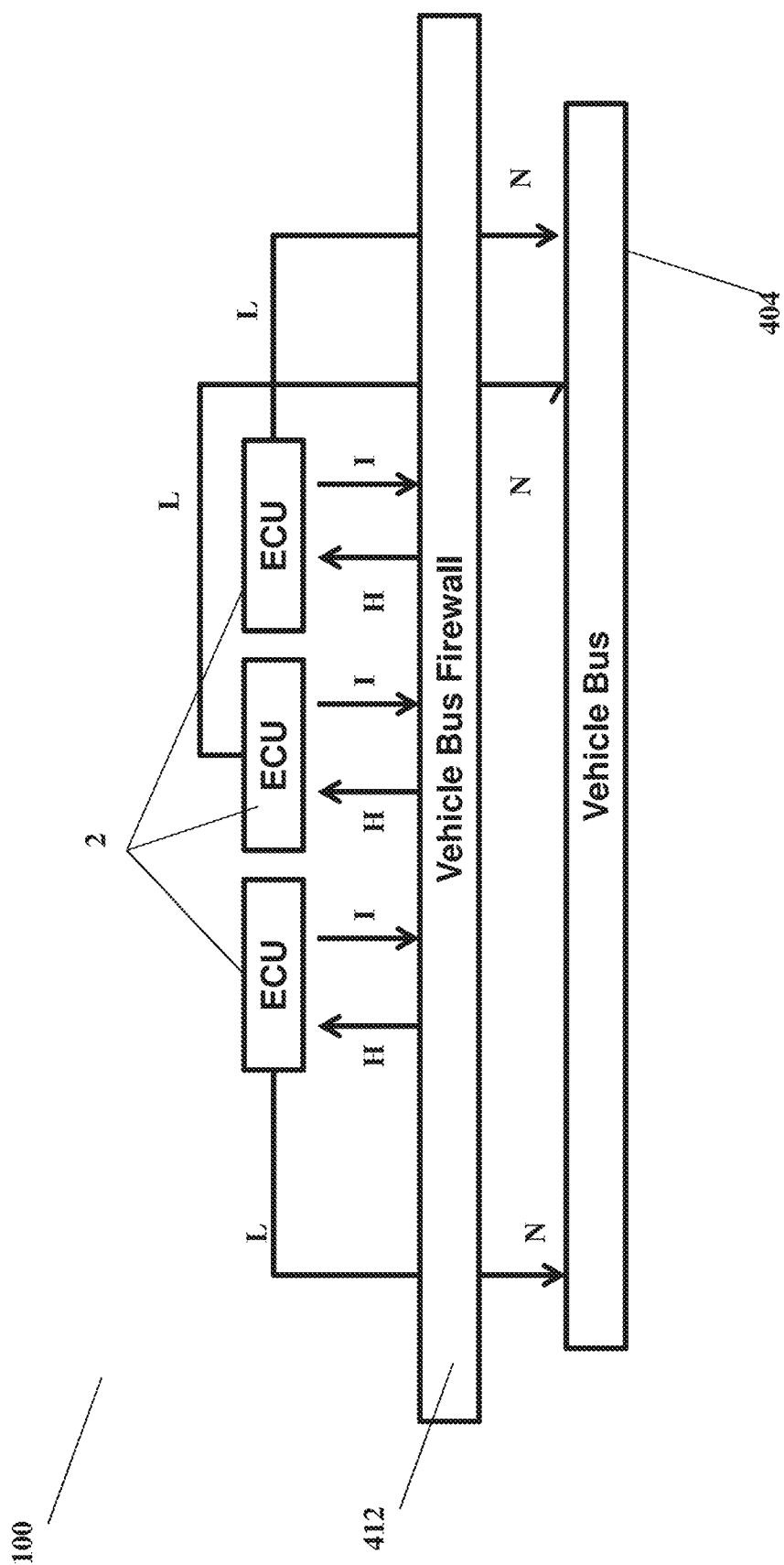
FIG. 4 is a schematic of the two essential aspects of the protection system

As shown in FIG. 4, in exemplary embodiments of the protection system 100 there are two essential aspects. First, the vehicle bus firewall 412 will periodically send a vehicle bus message (reference arrow H) to ECUs 402 to determine the state of the vehicle. In various embodiments, "periodically" might mean 1-10 times per second, and the ECUs send response messages (reference arrow I) to the vehicle bus firewall 412, which monitors the responses for updated vehicle status information. In certain embodiments, the vehicle status might include, but is not limited to, current vehicle speed, vehicle gear status, and braking status. In other embodiments, the vehicle bus firewall may determine vehicle state by interpreting messages sent through the firewall by various ECUs. Second, the ECUs 402 send all vehicle bus message responses (reference arrow L, FIG. 1 at 408) through vehicle bus firewall 412 before sending the approved messages (reference arrow N) to the vehicle bus 404. In exemplary embodiments, the vehicle bus firewall 10 has at least three vehicle bus filtering rules: BLOCK, ALLOW, and LOG. The vehicle bus firewall 412 will determine which one of the rules to apply based on the processing commands assigned to the firewall. The processing commands determine the vehicle bus filtering rules based on the vehicle status (called "context") and the message identity. If the filtering rule is BLOCK, the vehicle bus firewall 412 will prevent the message (FIG. 1 at 8) from being sent on to the vehicle bus 404 and a "message blocked" event will be logged. If the filtering rule is ALLOW, the vehicle bus firewall 412 will allow the message (FIG. 1 at 8) to be sent to the vehicle bus 404 and no event will be logged. If the filtering rule is LOG, the vehicle bus firewall 412 will allow the message (FIG. 1 at 8) to be sent to the vehicle bus 404 and a "message logged" event will be recorded.

Accordingly, exemplary embodiments of the protection system 100 comprise a vehicle bus firewall 412 which will utilize a set of context-based vehicle filtering rules. These rules define an action for each unique context and vehicle bus message response (FIG. 1 at 8). An example of this processing command can be seen in Table 1.

TABLE 1

Filtering rules based on context

| Message ID | Vehicle State | Action |
|---|---|---|
| 1 | Parked | Allow |
| 1 | Stopped | Allow |
| 1 | Moving | Log |
| 2 | Parked | Log |
| 2 | Stopped | Log |
| 2 | Moving | Block |
| ... | | |
| N | Parked | Allow |
| N | Stopped | Log |
| N | Moving | Block |

The expected vehicle bus response messages (FIG. 1 at 8) for a given context and identity can be defined during the engineering stage of the automobile and the information, in turn, can be used to program the processing commands.

Exemplary configurations of the various components and filtering firewalls can be seen in FIGS. 5-13. Accordingly, the flow of information between various components of the vehicle's electronic system can be controlled and otherwise regulated, as is shown in FIGS. 14-19. In each of these embodiments, the critical and non-critical features are separated from one another by at least one firewall, the firewall being configured to have access to a library of rules and states, and further being configured to apply the rules to control access from a non-critical component to a critical one. For example, should an infotainment system, such as a Wi-Fi connected audio player, be compromised by an attack, the protection system is able to prevent the non-critical system from accessing critical features, such as the antilock brakes.

Various embodiments of the protection system address single purpose ECU processing. For single-purpose ECUs performing control functions, there is less concern about vulnerabilities on the ECU being exploited by cyber-attacks causing malicious messages to be sent from the single purpose ECU to the other ECUs in the vehicle. Accordingly, the vehicle bus firewall in a single-purpose ECU typically performs two main actions. First, the vehicle bus firewall will periodically send a vehicle bus message to determine the state of the vehicle (for example 1-10 times per second). This can include current vehicle speed, and may include additional information such as vehicle gear status (e.g., park, drive, reverse, etc.). Additional information such as vehicle braking status may be included. This information can be recorded as the vehicle state. In exemplary embodiments, a minimum of three states are maintained (stopped, parked and moving). Also, all vehicle bus messages to this ECU are passed through a vehicle bus firewall on the ECU receiving the message and before the messages are processed by the ECU. The vehicle bus firewall in these embodiments has at least three vehicle bus filtering actions. These three vehicle bus filtering actions are BLOCK, ALLOW, and LOG. The vehicle bus firewall will determine which one of these actions to perform based on the information the vehicle bus firewall is programmed to look up. Additionally, in various embodiments, the vehicle bus firewall has access to a library of rules, and looks up the vehicle bus filtering rule based on the state of the vehicle (context) and the message ID. If the filtering rule action is BLOCK, the vehicle bus firewall will require the message to NOT be processed by the ECU and a "message blocked" event will be logged. Alternately, the filtering rule action is ALLOW, the vehicle bus firewall will require the message to be processed by the ECU and no event will be logged. Finally, if the filtering rule action is LOG, the vehicle bus firewall will require the message to be processed by the ECU and a "message logged" event will be logged.

Another variation of the protection system is vehicle bus bridge/firewall processing in embodiments where an ECU that is bridging vehicle bus traffic between two or more vehicle buses needs to perform bi-directional filtering based upon the vehicle state (context). In these embodiments, different filtering rules are applied depending upon the direction of the traffic, such that there is a first set of filtering rules for vehicle bus messages being sent from the critical to the non-critical vehicle bus, and a second set of rules for non-critical to critical vehicle bus messages. In these embodiments, the vehicle bus firewall will typically perform two main actions. First, the vehicle bus firewall will again periodically send a vehicle bus message to determine the state of the vehicle. This will include, at a minimum, current vehicle speed, and may include additional information such as vehicle gear status (park, drive, reverse, etc.). Additional information such as vehicle braking status may optionally be included. This information will be recorded as the vehicle state, with a minimum of three states maintained (stopped, parked and moving). Second, all vehicle bus messages to this ECU are passed through a vehicle bus firewall before being sent to the vehicle bus. The vehicle bus firewall in these embodiments has at least three CAN bus filtering actions. These three CAN bus filtering actions are BLOCK, ALLOW, and LOG. The CAN bus firewall will determine which one of these actions to perform based on the information the CAN bus firewall is programmed to look up. In these embodiments, the vehicle bus firewall looks up the vehicle bus filtering rule based on the state of the vehicle (context) and the message ID and the direction of the message. If the filtering rule action is BLOCK, the vehicle bus firewall will require the message to NOT be sent on to the vehicle bus and a "message blocked" event will be logged. Alternately, if the filtering rule action is ALLOW, the vehicle bus firewall will require the message to be sent on the vehicle bus and no event will be logged. Finally, if the filtering rule action is LOG, the vehicle bus firewall will require the message to be sent on the vehicle bus and a "message logged" event will be logged.

Another aspect of the protection system relates to protecting ECU signaling from cyber-attacks occurring via a gateway architecture using vehicle bus firewall processing. An ECU gateway provides communication from one or more external interfaces, such as cellular data, GPS, Wi-Fi, OBD-II, Ethernet, etc., to the vehicle. Some of the external communication interfaces require access to the vehicle bus to perform actions, such as remotely unlocking car doors via a telematics system, or to gather information, such as vehicle speed and mileage for fleet management systems. In these embodiments, different filtering rules are applied depending upon the interface that the message was received on (OBD-II port vs. Wi-Fi or cellular data). As such, the vehicle bus firewall in a vehicle bus gateway ECU will perform two main actions. First, the vehicle bus firewall will once again periodically send a vehicle bus message to determine the state of the vehicle, in a fashion similar to that described above with respect to other embodiments. Second, all vehicle bus messages to this ECU are passed through the vehicle bus firewall before being sent to the vehicle bus. The vehicle bus firewall in these embodiments has at least three vehicle bus filtering actions. These three vehicle bus filtering actions are BLOCK, ALLOW, and LOG. The vehicle bus firewall will determine which one of these actions to perform based on the information the vehicle bus firewall is programmed to look up. The vehicle bus firewall looks up the vehicle bus filtering rule based on the state of the vehicle (context) and the message ID and the interface on which the message was received. If the filtering rule action is BLOCK, the vehicle bus firewall will require the message to NOT be sent on the vehicle bus and a "message blocked" event will be logged. Alternately, if the filtering rule action is ALLOW, the vehicle bus firewall will require the message to be sent on the vehicle bus and no event will be logged. Finally, if the filtering rule action is LOG, the vehicle bus firewall will require the message to be sent on the vehicle bus and a "message logged" event will be recorded.

In alternate embodiments, the protection system further addresses logging event notifications by a vehicle bus firewall. In these embodiments, when a vehicle bus firewall logs an event, a new vehicle bus message type is generated to report this event. In further embodiments this event can be sent to a telematics unit that will forward the event to a telematics operations center. Additionally, this event can also be sent to the dashboard ECU which can signal the driver via a dashboard display. Further explanation of these various embodiments of the protection system are explained in detail in relation to the drawings.

Figure 5:
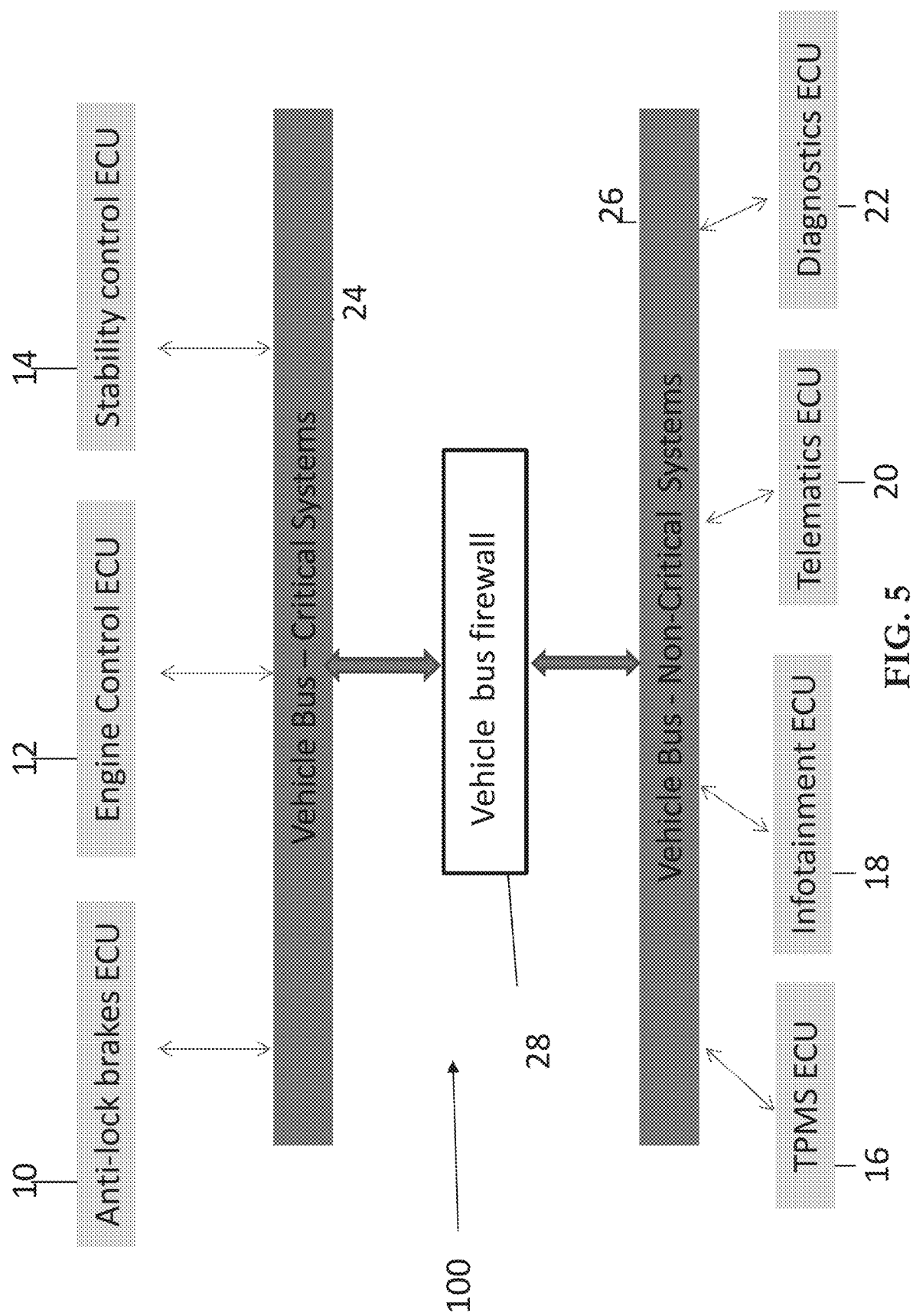
FIG. 5 is a schematic of an overview of a segregated vehicle bus protection system and method.

In various embodiments, shown in FIG. 5, the system 100 differentiates between critical systems, examples of which include anti-lock brakes ECU 10, engine control ECU 12 and stability control ECU 14, and non-critical systems, examples of which are tire-pressure monitoring systems ECU ("TPMS") 16, infotainment ECU 18, telematics ECU 20 and diagnostics ECU 22. In certain embodiments, the critical system has a critical system vehicle bus 24 that is distinct from the non-critical system vehicle bus 26. In further embodiments, these two vehicle buses 24 and 26 are in electronic communication via the vehicle bus firewall 28, such that they are only able to communicate with one another when the firewall permits.

Figure 6:
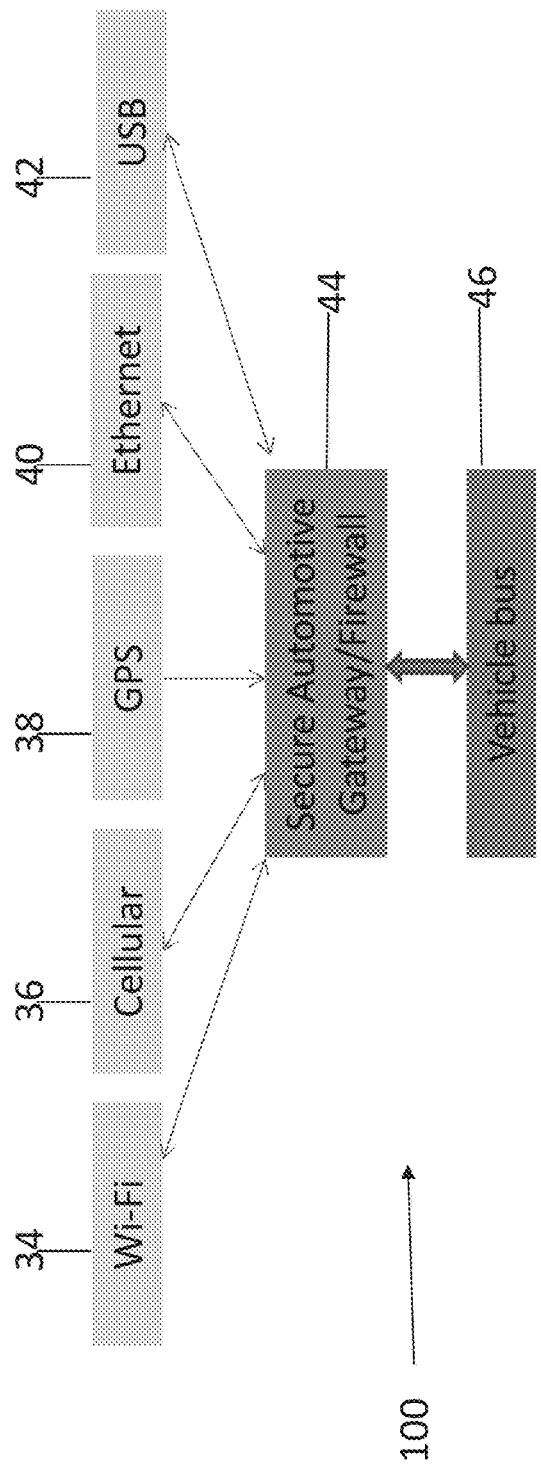
FIG. 6 is a schematic of an overview of a secure gateway protection system and method.

In further embodiments, shown in FIG. 6, the protection system 100 uses a secure gateway ECU protection system. In exemplary embodiments, the secure gateway ECU protection system can include one or more outside system connection components, such as Wi-Fi 34, cellular data 36, GPS 38, Ethernet 40, and USB 42. These connection components are in electronic communication with the secure automotive gateway 44. This secure automotive gateway 44 is in electronic communication with the vehicle bus 46. The secure automotive gateway 44 determines, based on the vehicle bus filtering rules, when actions sent by the various types of connections are sent to the vehicle bus and when they are blocked.

Figure 7:
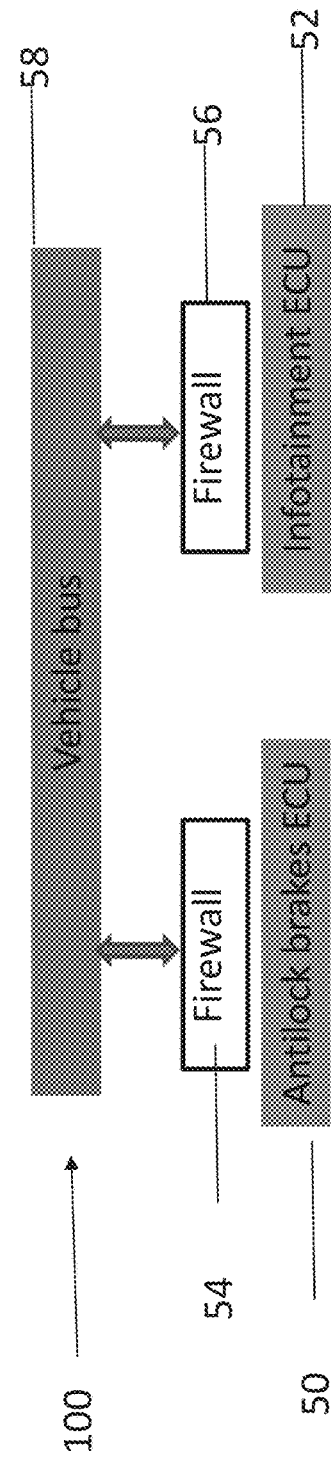
FIG. 7 is a schematic of an overview of a bidirectional filtering secure ECU protection system and method.

In certain embodiments, shown in FIG. 7, the protection system 100 features bidirectional filtering for secure ECU protection. In this embodiment, the automotive system 100 might include, for example, an antilock brake ECU 50 and an infotainment ECU 52. In these embodiments, these components are protected by one or more firewalls 54, 56, and in turn, the firewalls 54, 56 are in direct electronic communication with the vehicle bus 58. As in other embodiments, the firewalls 54, 56 determine when the signals from the ECUs 50, 52 are sent onto the vehicle bus, when they are blocked. Further, the firewalls 54, 56 determine when the signals from the vehicle bus 58 are sent to the ECUs 50, 52 and when they are blocked.

Figure 8:
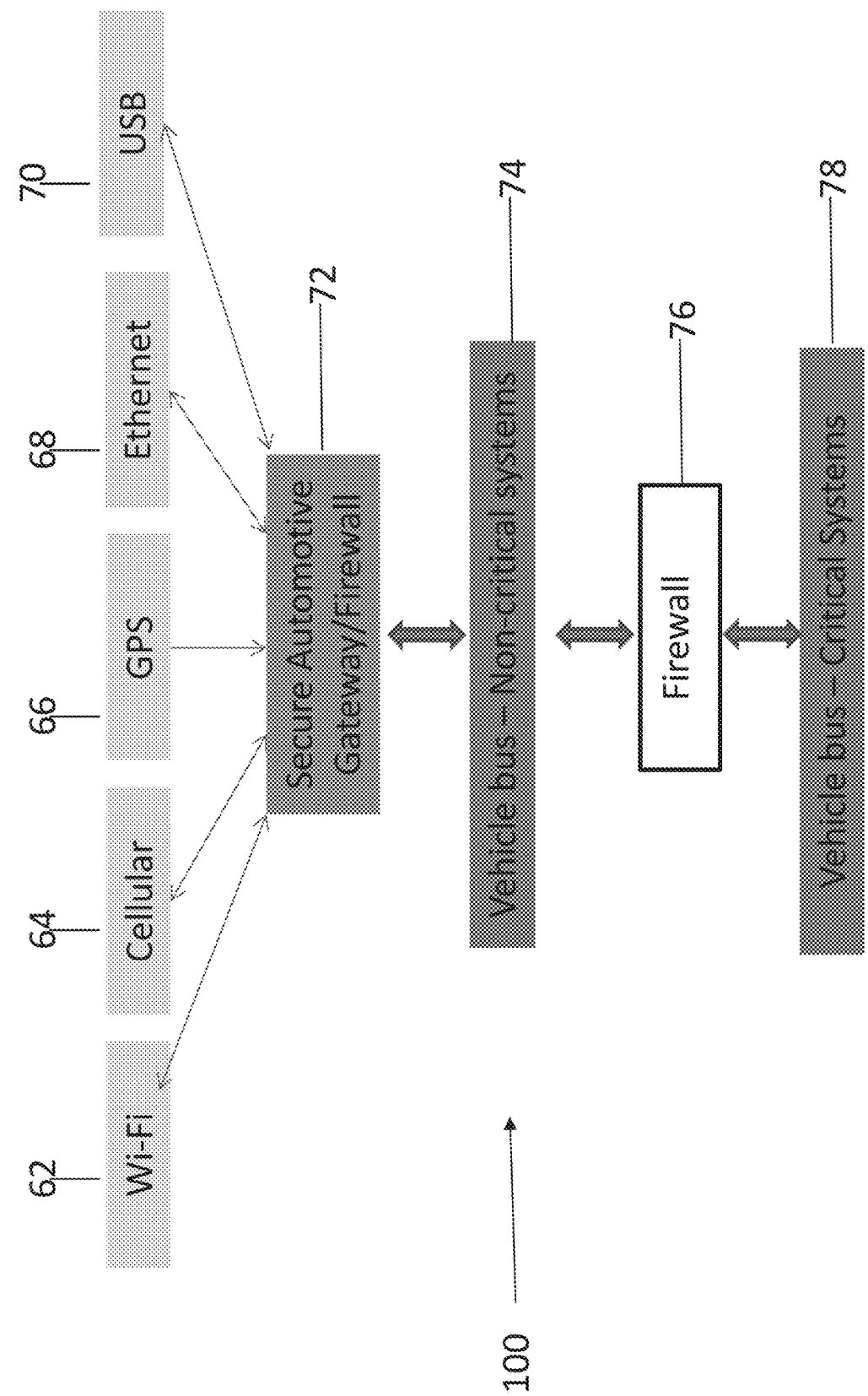
FIG. 8 is a schematic of an overview of a hybrid gateway/firewall vehicle bus protection system and method.

Continuing on to FIG. 8, in various embodiments the protection system 100 features a hybrid gateway/firewall vehicle bus protection system. In exemplary embodiments, this protection system includes one or more outside system connection components, such as Wi-Fi 62, cellular data 64, GPS 66, Ethernet 68, and USB 70. These components are in communication with the secure automotive gateway 72. In turn, the secure automotive gateway 72 is in communication with the vehicle bus for non-critical systems 74, which in turn is in communication with the firewall 76. Finally, the vehicle bus for non-critical systems 74 is in turn in communication with the vehicle bus for critical systems 78. This structure is beneficial because it adds additional protection between the non-critical vehicle bus 74 and the critical vehicle bus 78. The secure automotive gateway 72 determines, based on the vehicle bus filtering rules, when actions sent by the various types of connections are sent to the vehicle bus for non-critical systems 74, to the vehicle bus for critical systems 78, and when they are blocked. The firewall 76 only allows communication between the two vehicle buses 74, 78 when the programmed filtering rule is ALLOW.

Figure 9:
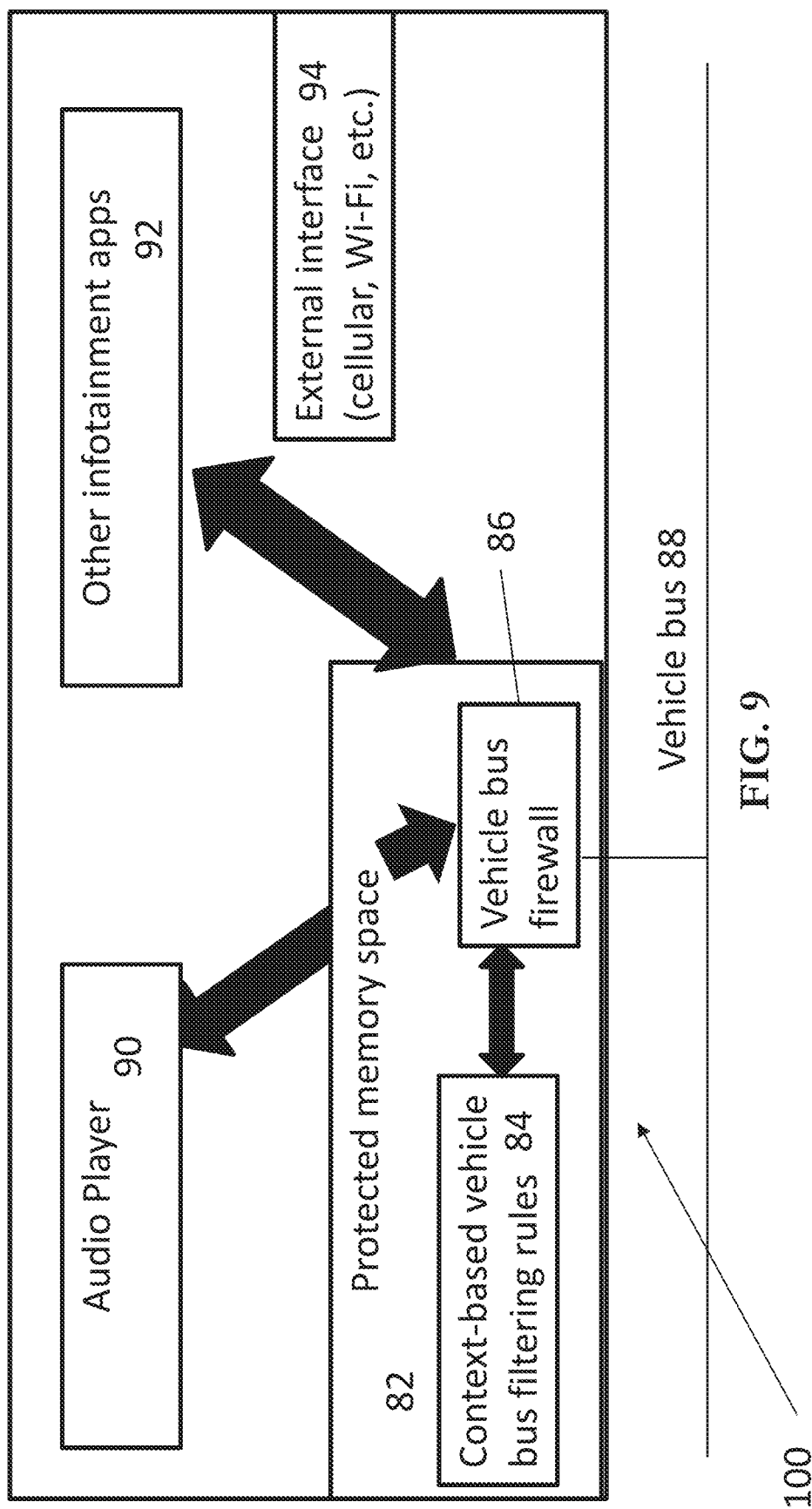
FIG. 9 is a schematic of an overview of an infotainment ECU system.

In further embodiments, shown in FIG. 9, the protection system 100 might feature an infotainment ECU system. In exemplary embodiments, the protected memory space 82 contains the context-based vehicle bus filtering rules 84, which are in turn in communication with the vehicle bus firewall 86. Further, the vehicle bus firewall 86 is in communication with the vehicle bus 88. The vehicle bus firewall 86 is additionally in communication with other infotainment apps, for example an audio player 90 or other infotainment apps 92. These apps are controlled through an external interface 94. The audio player 90 and other infotainment apps 92 provide the vehicle bus firewall 86 with appropriate information. Based on the appropriate vehicle bus filtering rule determined by the context-based vehicle bus filtering rules 84, the vehicle bus firewall 86 will perform the appropriate function and either send the information onto the vehicle bus 88 or block the information from being sent. In further embodiments, the protected memory space 82 ensures that if an application, such as the audio player 90, is compromised by a cyber-attack, the compromised application cannot disrupt the processing of the vehicle bus firewall 86.

Figure 10:
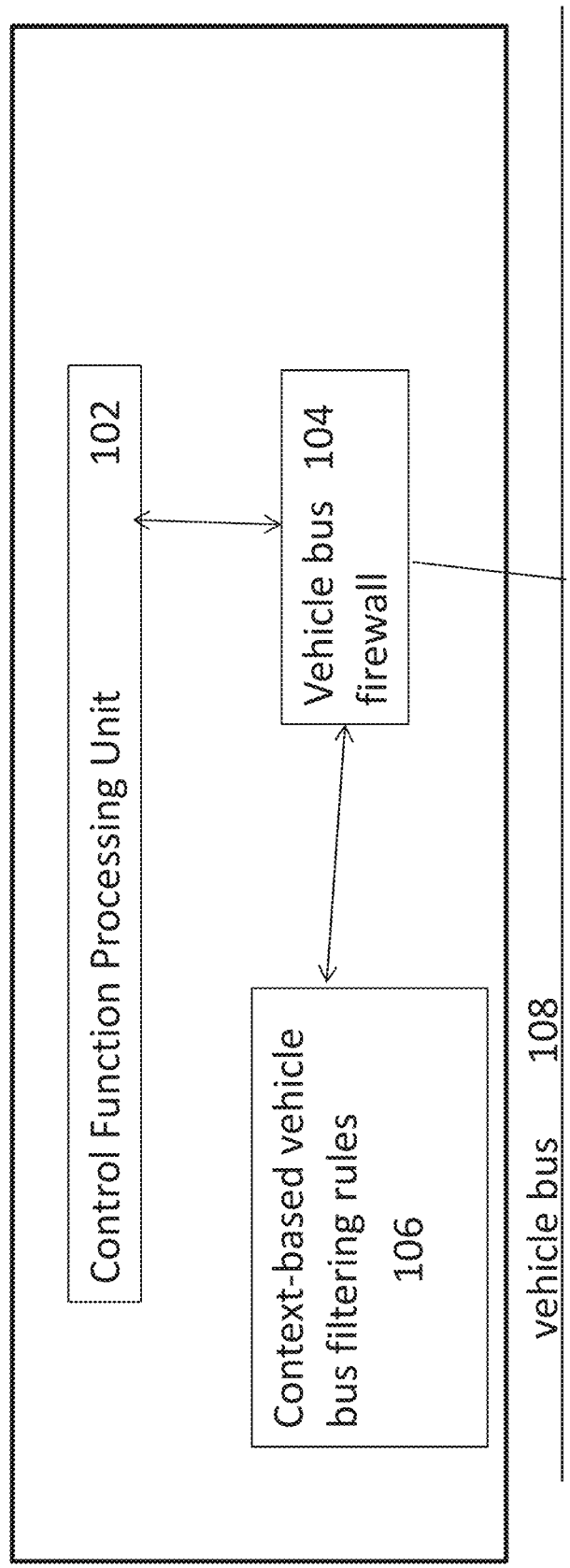
FIG. 10 is a schematic of an overview of a single purpose ECU protection system and method.

In certain embodiments, shown in FIG. 10, the protection system 100 might comprise a single purpose ECU protection system. In exemplary embodiments, a single control function processing unit 102 is in communication with the vehicle bus firewall 104. The vehicle bus firewall 104 is additionally in communication with the context-based vehicle bus filtering rules 106 and the vehicle bus 108. The control function processing unit 102 then provides the vehicle bus firewall 104 the information needed to determine which vehicle bus filtering rule to apply, as given by the context-based vehicle bus filter rules 106. The vehicle bus firewall 104 then applies the appropriate vehicle bus filtering rule 106 and either passes the information onto the vehicle bus 108 to perform the appropriate function or blocks the information from being sent.

Figure 11:
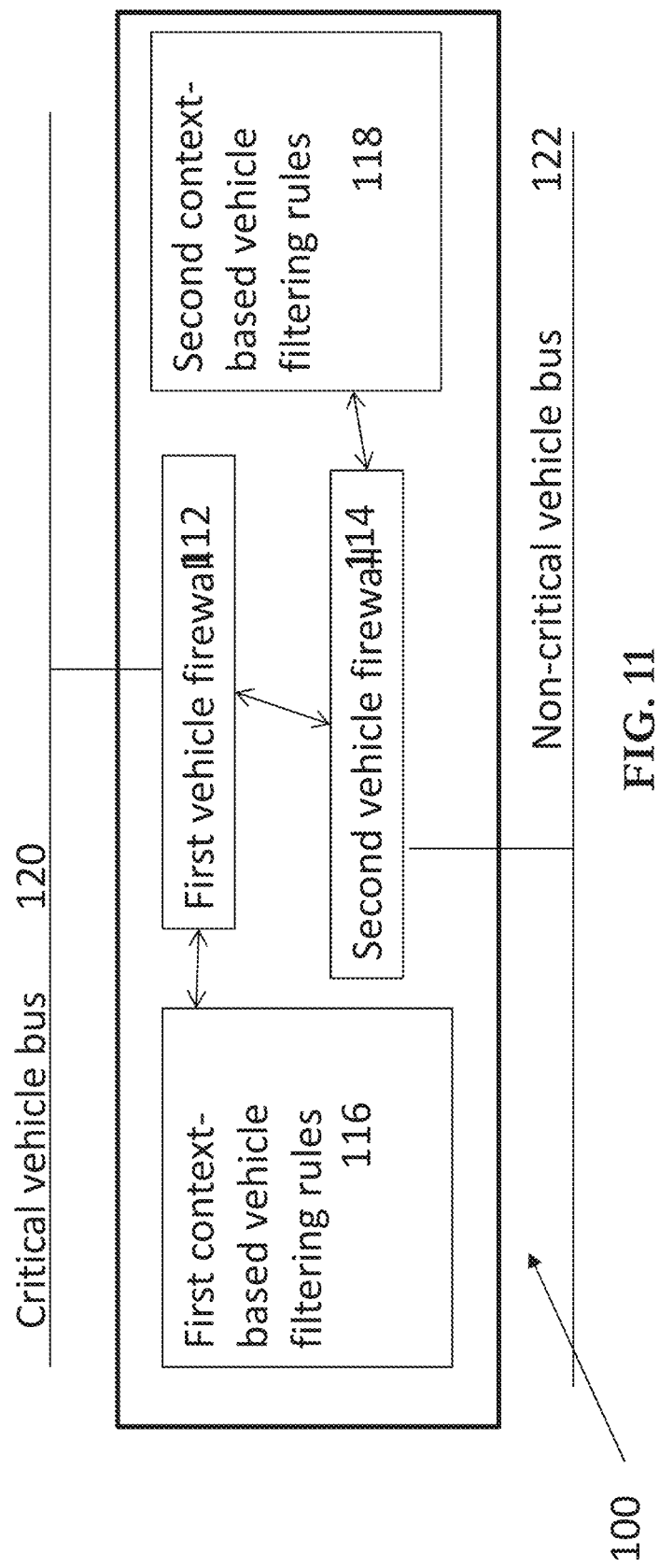
FIG. 11 is a schematic of an overview of a vehicle bus bridge ECU protection system and method.

Continuing on to FIG. 11, in further embodiments the protection system 100 might feature a vehicle bus bridge ECU protection system. In exemplary embodiments the two separate vehicle bus firewalls 112, 114 are in communication with each other. The first vehicle bus firewall 112 is governed by the first context-based vehicle bus filtering rules 116. The second vehicle bus firewall 114 is governed by the second context-based vehicle bus filtering rules 118. Additionally, the first vehicle bus firewall 112 is in communication with the critical vehicle bus 120, and the second vehicle bus firewall 114 is in communication with the non-critical vehicle bus 122. In certain embodiments, the two firewall systems allow for multi-level protection based on the appropriate information contained in both firewalls 112, 114 and both context-based vehicle bus filtering rules 116, 118. The protection systems can then allow the first and second firewalls, 112 and 114, respectively, to determine which systems are critical, for example anti-lock brakes, and which systems are non-critical, for example satellite radio. In exemplary embodiments, if it is a critical system, the first vehicle bus firewall 112 will look up the necessary information based on vehicle state and message ID and then apply the appropriate vehicle bus filtering rule based on this determination. In further embodiments, this vehicle bus filtering rule the firewall will either send the information to the critical vehicle bus 120 or block the information from being sent. The second vehicle bus firewall 114 will perform the same process for non-critical systems based on the second context-based vehicle bus filtering rules 118.

Figure 12:
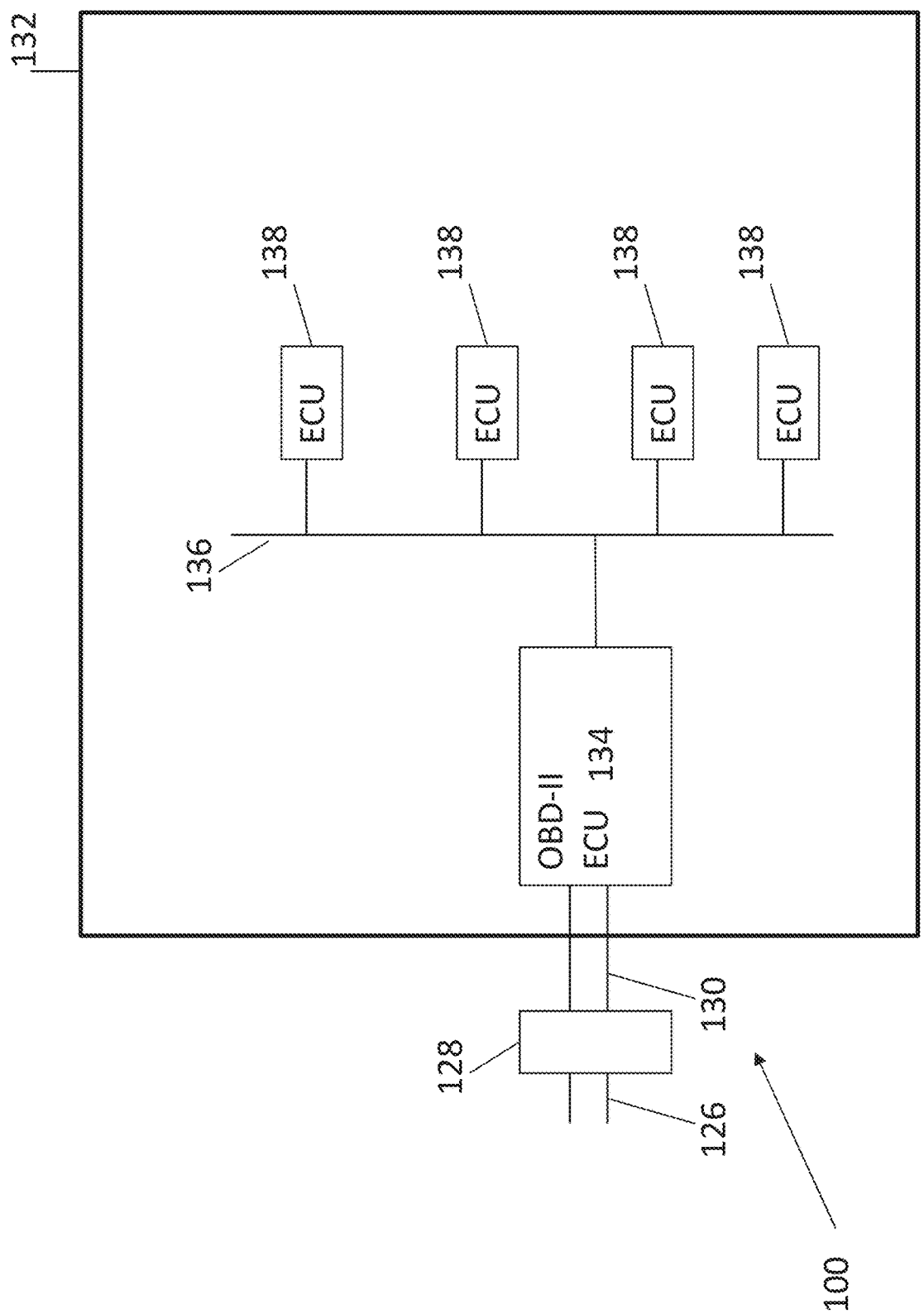
FIG. 12 is a schematic of an overview of an aftermarket ECU firewall.

In various embodiments, shown in FIG. 12, the protection system 100 may feature an aftermarket ECUfirewall. In exemplary embodiments, an external communication platform, such as an OBD-II Interface 126, connected to an aftermarket ECU firewall 128 and then connected to an OBD-II port 130 that goes into the vehicle 132. The OBD-II port 130 is also connected to the OBD-II ECU 134, which is in communication with the vehicle's vehicle bus 136. The vehicle's vehicle bus 136 is optionally in further connected with numerous ECUs 138. For example, the OBD-II port 130 is the physical component that allows external devices to be connected to a vehicle for the purpose of allowing service personnel to diagnose issues and extract information for servicing a vehicle. The aftermarket ECU firewall 128 provides protection from abuse of this OBD-II port capability. The aftermarket ECU firewall 128 is in communication with an OBD-II interface 126 that can be utilized by the external devices. The internal OBD-II ECU 134 and the other various ECUs 138 are protected from a cyber-attack through the OBD-II port by the aftermarket ECU firewall 128.

Figure 13:
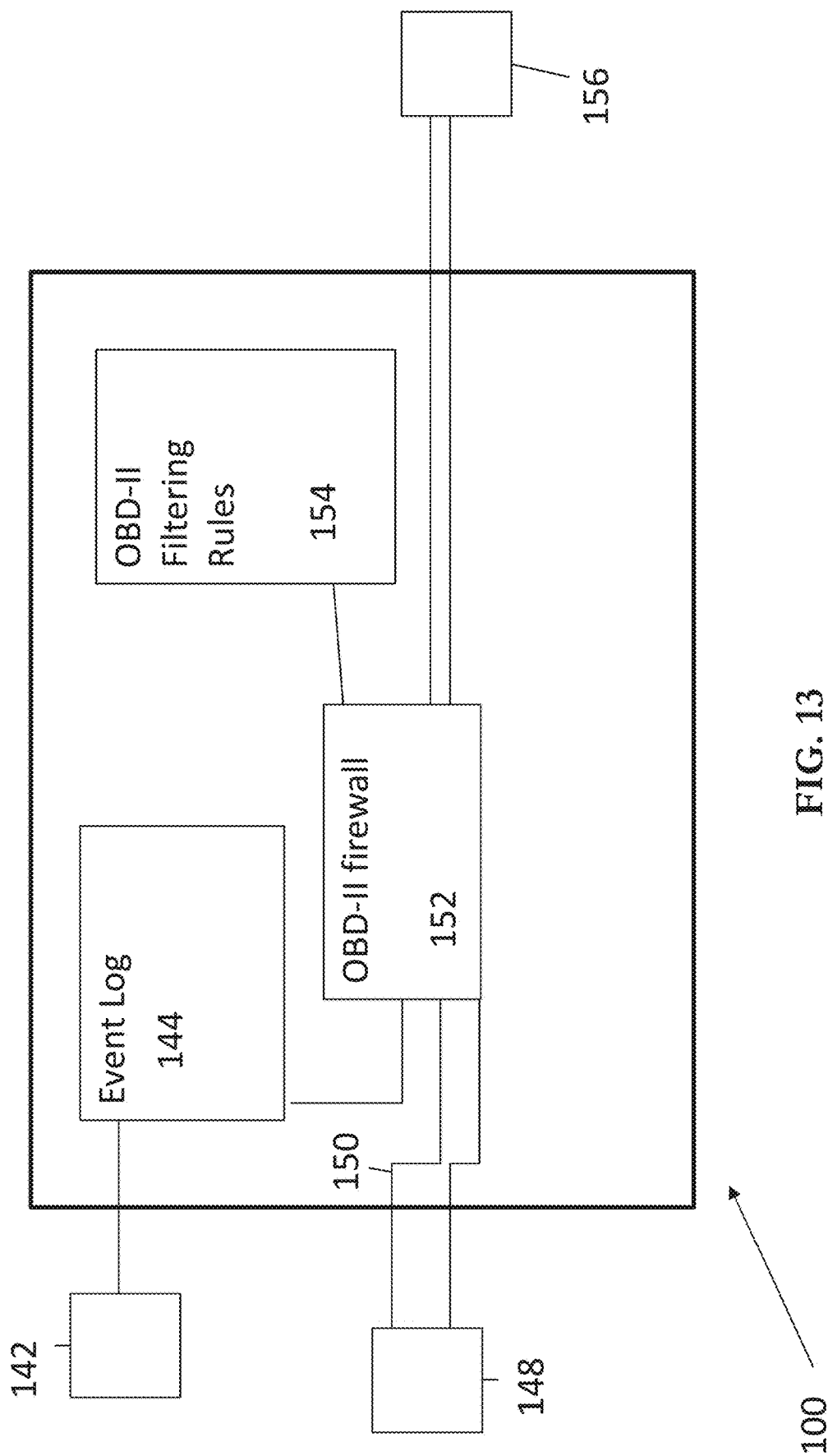
FIG. 13 is a schematic of an overview of an aftermarket add-on vehicle bus firewall.

In certain embodiments, shown in FIG. 13, the protection system could be implemented as an aftermarket add-on vehicle bus firewall embodiment. In exemplary embodiments, an external interface 142 might be in communication with an event log 144. The event log 144 could be in further communication with an OBD-II firewall 146. Additionally, an OBD-II interface 148 could be in communication with an external OBD-II port 150, which in turn is communication with an OBD-II firewall 152. This OBD-II firewall 152 can be controlled by the OBD-II filtering rules 154. Further, the OBD-II firewall 152 is in communication with an internal OBD-II port 156 connected to the vehicle 132. FIG. 13 shows a more detailed example of the protection system 100 in FIG. 12. In this example, the external interface 142, OBD-II interface 148, and OBD-II port 150 provide access for external devices to the internal OBD-II port 156, but are protected by the OBD-II firewall 152. The firewall 152 determines the appropriate filtering rules from the OBD-II filtering rules 154 and either sends the information onto the internal OBD-II port 156 connected to the vehicle or blocks the information and additionally logs the information in the event log 144.

Figure 14:
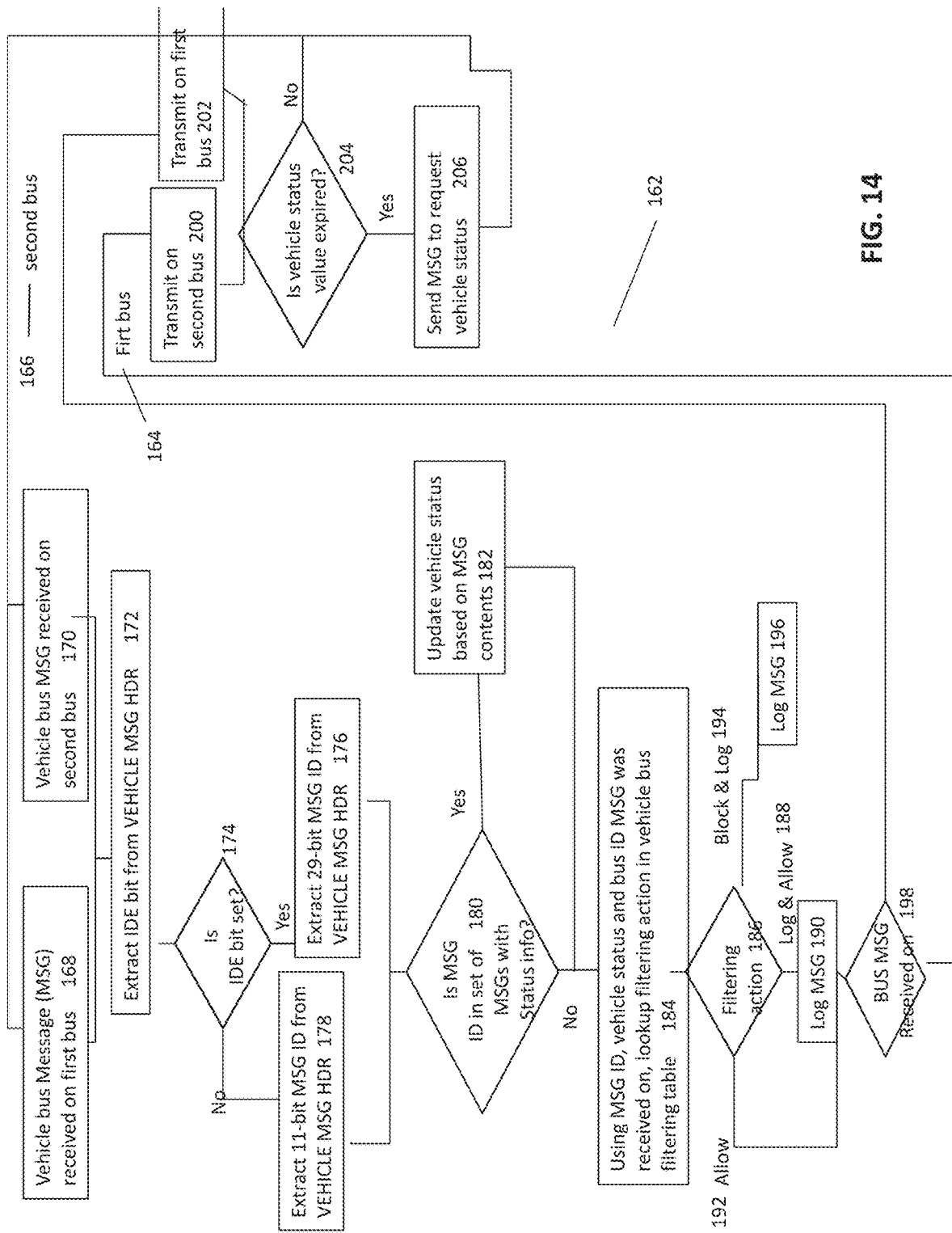
FIG. 14 is a schematic of an overview of a vehicle bus firewall filtering vehicle bus bridge program.

FIG. 14 shows an exemplary embodiment of the protection system 100 featuring the process utilized by the vehicle bus firewall filtering vehicle bus bridge 162. This process is utilized in a number of disclosed embodiments, and specifically in the first and second vehicle bus firewalls 112 and 114 of FIG. 7. In these exemplary embodiments, two separate vehicle buses are being operated: a first bus 164 and a second bus 166. In the disclosed embodiments the series of optional steps begins by either first bus 164 receiving a vehicle bus message (block 168) or second bus 166 receiving a vehicle bus message (block 170).

Regardless of which bus receives the vehicle bus message, (block 168) or (block 170), the process for CAN bus messages, then flows to the block that extracts the identifier extension IDE bit from the CAN MSG header ("HDR") (block 172). Based on this extracted data, the process then asks whether the IDE bit is set (block 174). If the answer is yes, the process then extracts the 29-bit message ID from the CAN MSG HDR (block 176). If the answer is no, the process then extracts the 11-bit message ID from the CAN MSG HDR (block 178). Regardless of which bit is extracted, in the case of CAN bus messages, or if the message is received on another type of vehicle bus the process the asks whether the message ID is in the set of messages with status information (block 180). If the answer is yes, the vehicle status based on the message contents is updated (block 182). If the answer is no, the process skips this step. Next, the process uses the message ID, vehicle status and bus ID message received to look up the filtering action in the appropriate vehicle bus filtering table (block 184). Based on the result that is returned by the vehicle bus filtering table the filtering action is performed (block 186). If the filtering action is Log & Allow (block 188), the message is first logged (block 190) and then continues on the path described for the filtering result for Allow (block 192). If the filtering result is Block & Log (block 194) the message will be logged (block 196) and the process will begin again. If the filtering result is Allow (block 192), the process will then determine whether the message was received on the first bust or the second bus (block 198). If the message was received on the first bus 164, the process will transmit the message of the second bus (block 200). If the message was received on the second bus 166 the process will transmit the message on the first bus (block 202). The process lastly asks whether the vehicle status value has expired (block 204). If the answer is no, the process will send a message to request the vehicle status (block 206), and then the process will begin again.

Figure 15:
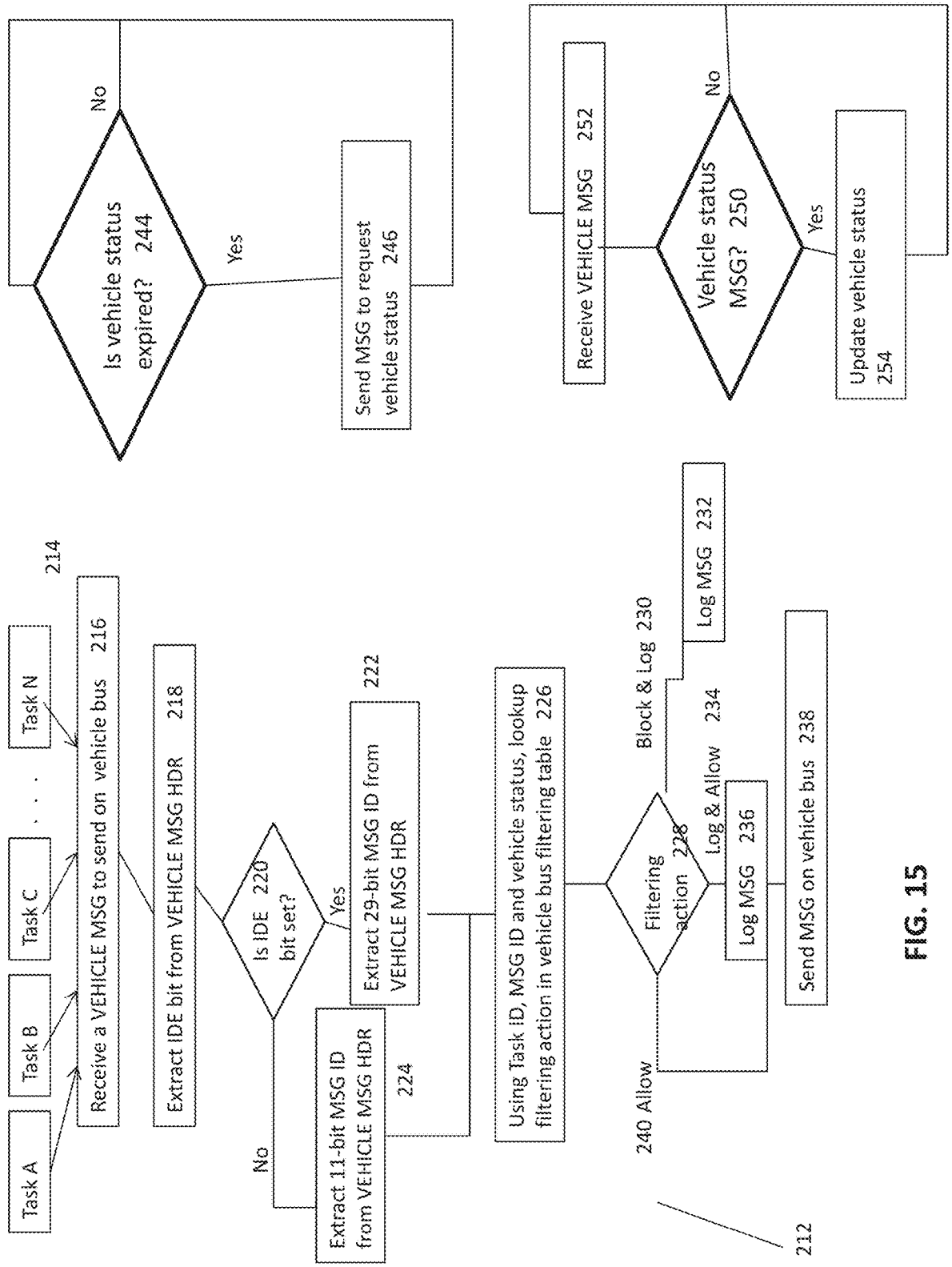
FIG. 15 is a schematic of an overview of a vehicle bus firewall filtering for a complex ECU program.

Continuing with FIG. 15, in certain exemplary embodiments, the protection system 100 features the process utilized by the vehicle bus firewall filtering for a complex ECU 212, for example, an infotainment ECU. This process is optionally used in a number of disclosed embodiments and specifically used in the vehicle bus firewall 86 in FIG. 9. In certain exemplary embodiments, the series of optional steps begins with one of the tasks 124, such as the audio player task, which attempts to send an internal message. The internal message is translated into a vehicle bus message of various possible vehicle bus messages that are to be transmitted onto the vehicle bus, which first encounters the vehicle bus firewall (such as the vehicle bus firewall 86 shown in FIG. 9). These vehicle bus messages are received as a vehicle bus message on the vehicle bus (block 216). In certain embodiments, the task 214 message is reformatted into a vehicle bus message before it is received (block 216). If the message is received on a CAN bus, the process then extracts the IDE bit from the CAN MSG HDR (block 218). The process then asks if the IDE bit is set (block 220). If the answer is yes, the process extracts a 29-bit MSG ID from the CAN MSG HDR (block 222). If the answer is no, the process extracts an 11-bit MSG ID from the CAN MSG HDR (block 224), or the appropriate message ID from the MSG HDR if the message is received on a different type of vehicle bus. Regardless of this choice, the process for these exemplary embodiments then uses the task ID, MSG ID and vehicle status to lookup the filtering action in the vehicle bus filtering table (block 226). In these exemplary embodiments, the vehicle bus filtering table provides the firewall with three filtering actions (block 228). If the filtering action is Block & Log 230, then the message is logged (block 232). If the action is Log & Allow (block 234), then the message is logged (block 236) and then the message is sent on to the vehicle bus (block 238). If the action is Allow (block 240), then the message is sent on to the vehicle bus (block 238). At the same time, the firewall is running two additional questions. The first question is whether the vehicle status has expired (block 244). If the answer is no then process delays for a predefined period before it then loops and asks the question again (block 244). If the answer is yes, a message is sent to request the vehicle status (block 246). The second question is whether there a vehicle status message (block 250). If the answer is no, the process loops until a vehicle bus message is received (block 252). If the answer is yes, then the vehicle status is updated (block 254) and the process is looped until a vehicle bus message is received (block 252).

Figure 16:
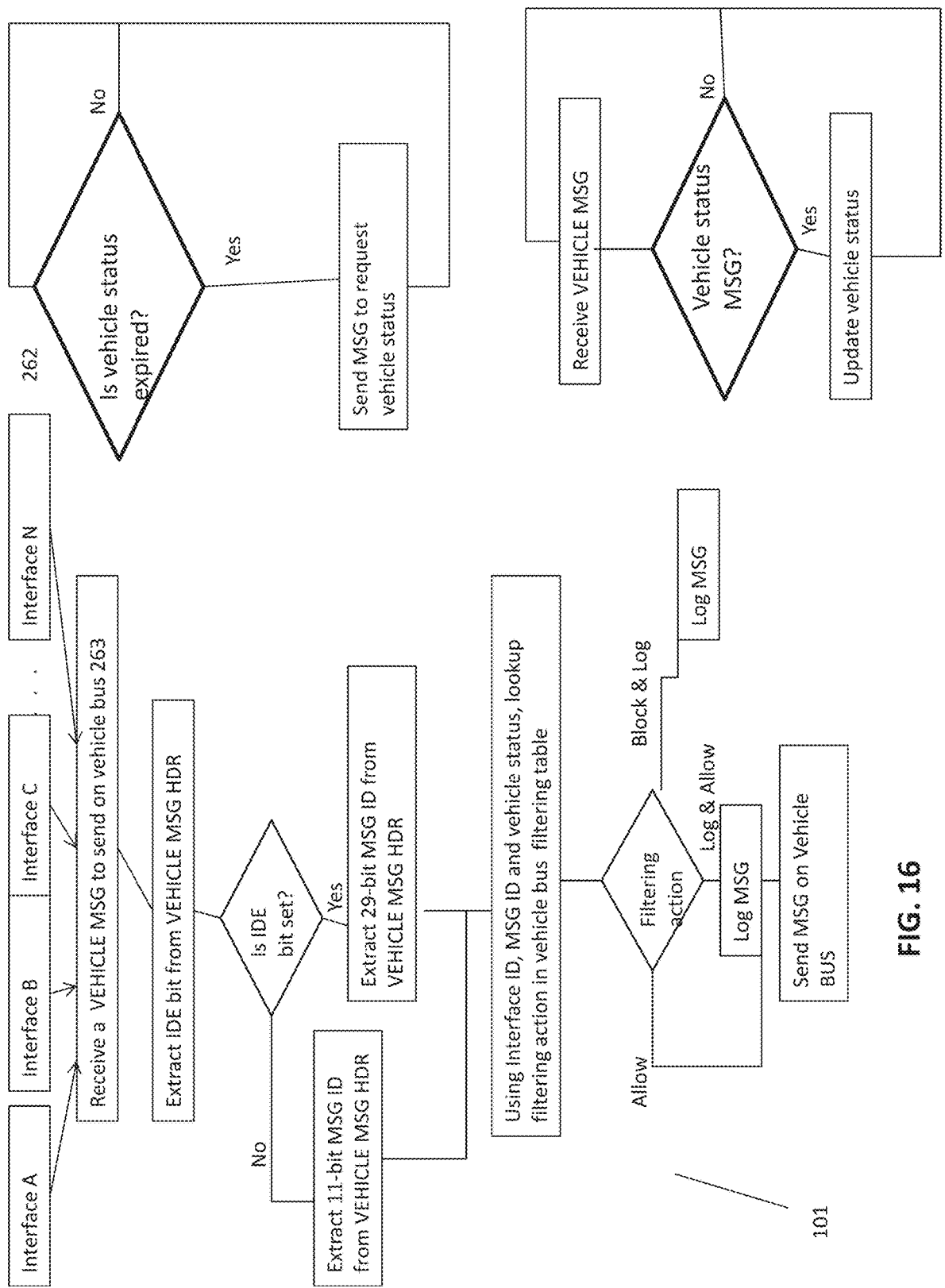
FIG. 16 is a schematic of an overview of a vehicle bus firewall filtering for a gateway ECU program.

Continuing with FIG. 16, in certain exemplary embodiments of the protection system 100, the process is utilized by the vehicle bus firewall filtering for a gateway ECU 260. The disclosed process is utilized by a number of disclosed embodiments, and specifically by firewall 76 in FIG. 8 and by firewall 44 in FIG. 6. These exemplary embodiments run the same process described for FIG. 15, but instead of tasks sending internal messages that are translated into vehicle bus messages, external communication platforms, such as WiFi or cellular data, are sending messages. Additionally, to receive a vehicle bus message (block 263) the gateway ECU reformats the interface 262 messages into vehicle bus messages when they are received (block 263).

Figure 17:
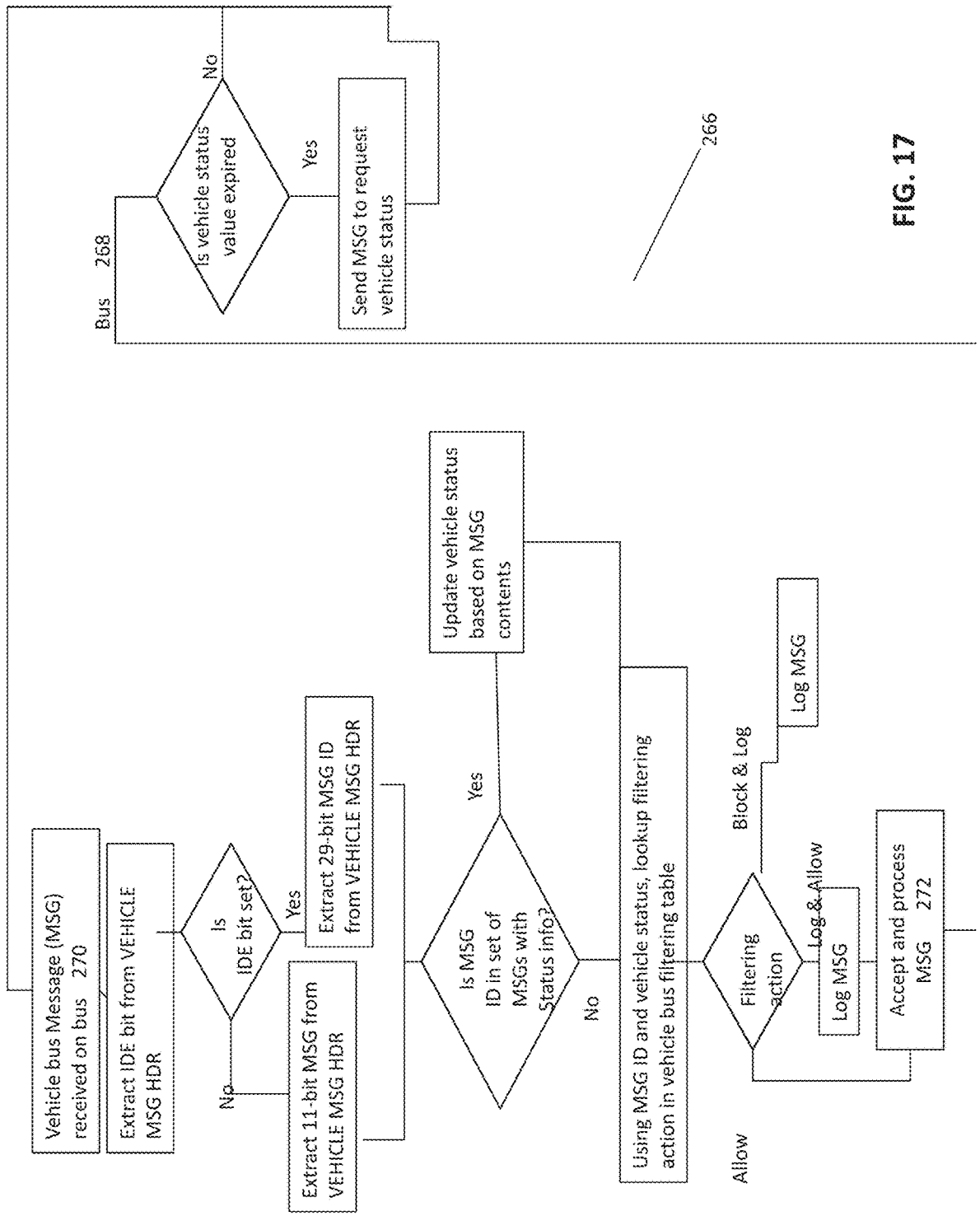
FIG. 17 is a schematic of an overview of a vehicle bus firewall single purpose ECU program.

Continuing to FIG. 17, in further exemplary embodiments of the protection system 100, the process features the vehicle bus firewall for a single purpose ECU 266. The disclosed process is utilized by a number of disclosed embodiments, and specifically by vehicle bus firewall 104 in FIG. 10. These exemplary embodiments run a similar process as shown in FIG. 14, except there is only one bus 268. As a result, there is only one bus to receive the vehicle bus message (block 270) and no transmission on a second bus is necessary. Additionally, instead of forwarding the vehicle bus message, as in (block 198) in FIG. 14, the ECU accepts/processes the vehicle bus message (block 272).

Figure 18:
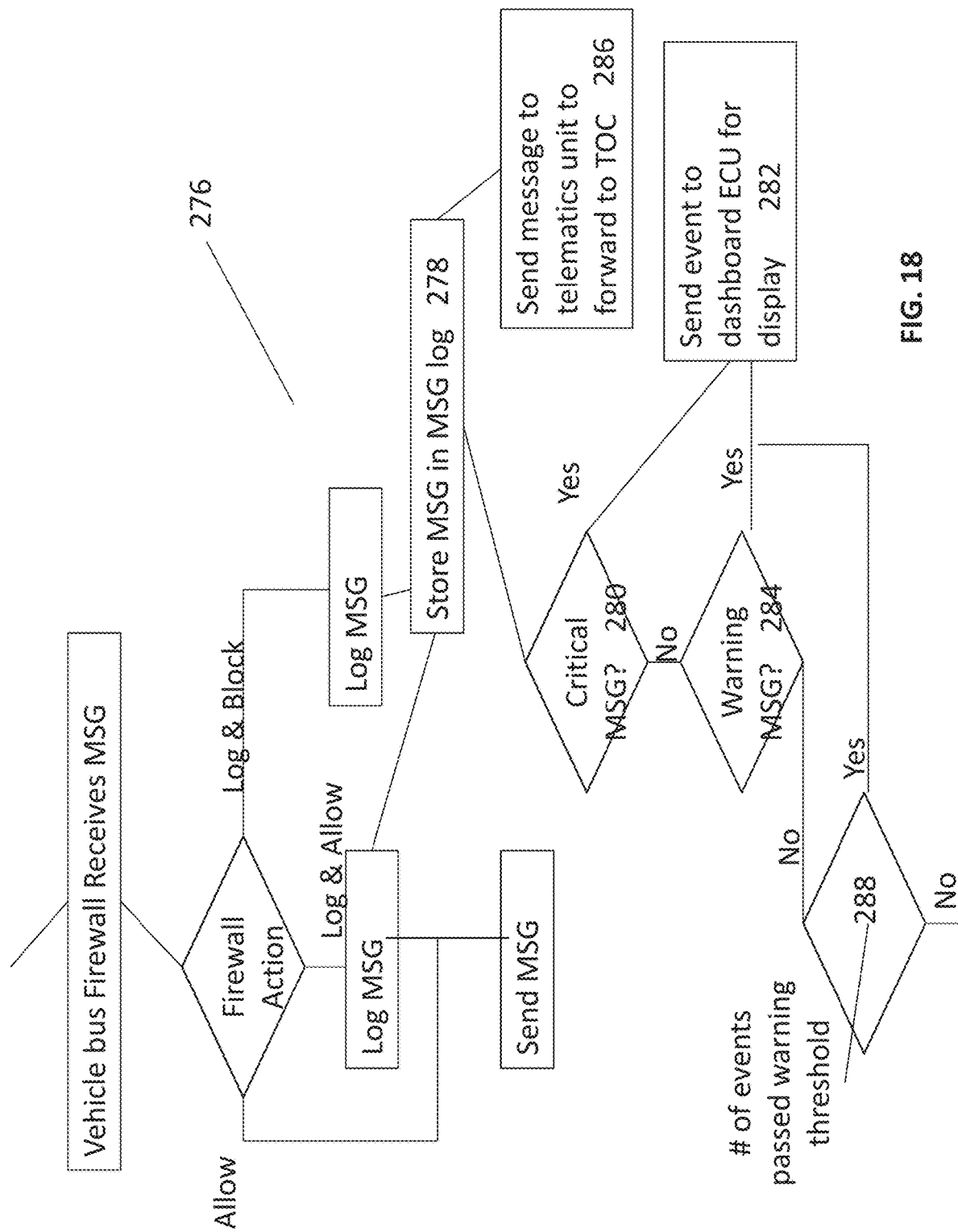
FIG. 18 is a schematic of an overview of a message logging and reporting program.

FIG. 18 is a further exemplary embodiment of the protection system 100 featuring the process utilized by the message logging and reporting system 276. The disclosed process is utilized in a number of disclosed embodiments, and specifically by first and second vehicle bus firewalls 112 and 114 in FIG. 11, vehicle bus firewall 104 in FIG. 10, and vehicle bus firewall 86 in FIG. 9. In the series of optional steps of this embodiment, the firewall message and action are received and the action is chosen as described in FIGS. 14 and 15. The additional step is that the process logs and stores messages in the log (block 278), and sends them to the Telematics Operations Center (TOC) (block 286). The process then asks if it is a critical message (block 280). If the answer is yes, the event is sent to the dashboard ECU for display (block 282). If the answer is no, the process then asks if it is a warning message (block 284). If the answer is yes, the process then asks if the number of events is passed the warning threshold (block 288). If the answer is yes, the event is sent to the dashboard ECU for display (block 282). If the answer is no, no action is taken. The process restarts when another vehicle bus firewall message is received.

Figure 19:
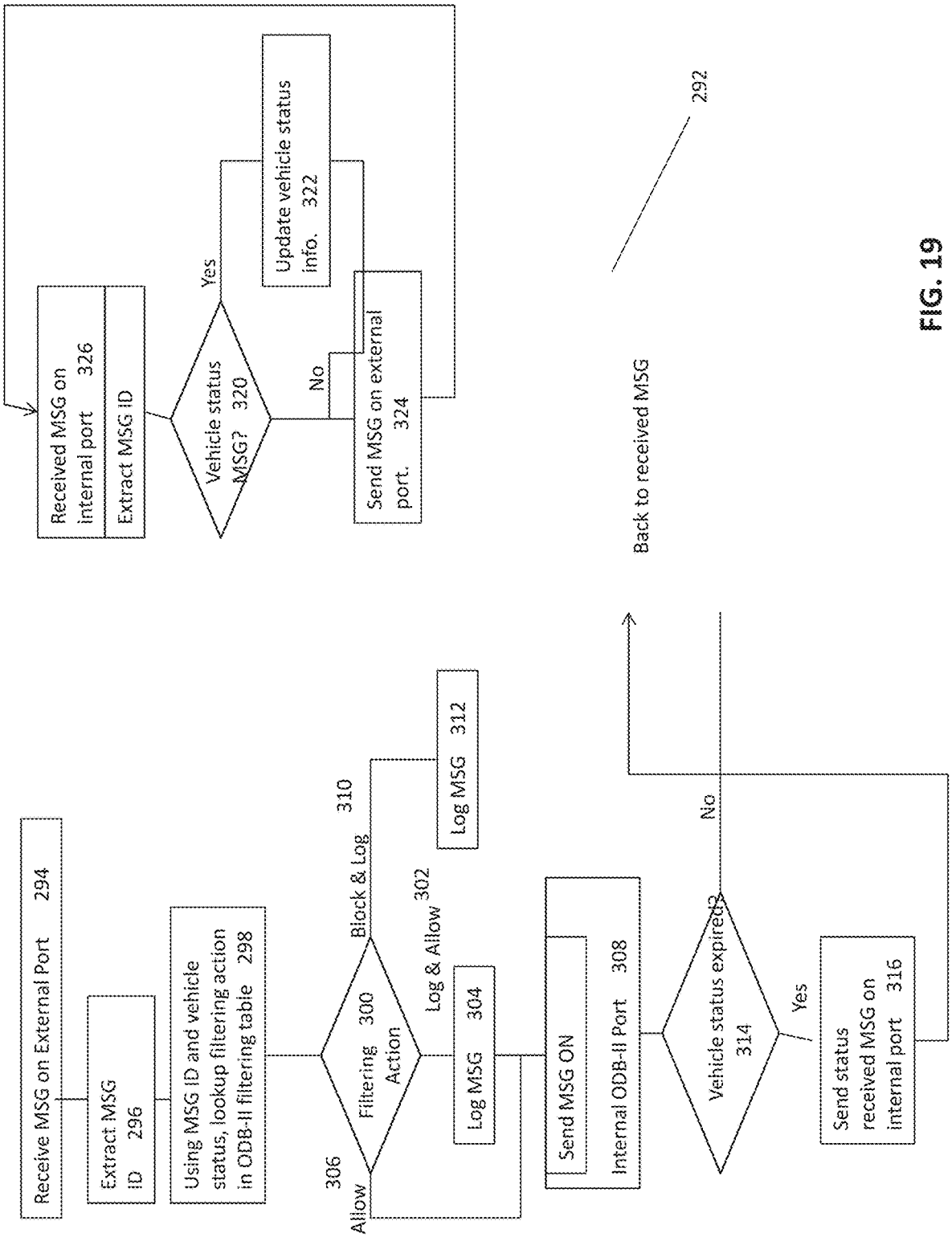
FIG. 19 is a schematic of an overview of an OBD-II MSG firewall program.

Continuing with FIG. 19, in further exemplary embodiments the protection system 100 features the process utilized by the OBD-II message firewall 292. The disclosed process is utilized in a number of disclosed embodiments, and specifically in the OBD-II firewall 152 in FIG. 13. These exemplary embodiments utilize a series of optional steps by which a message is received on the external port (block 294). The message ID is then extracted (block 296). Next, the process uses the message ID and vehicle status lookup filtering action in the OBD-II filtering table (block 298) to determine the filtering action (block 300). If the filtering action is Block & Log 310, the message is logged (block 312). If the action is Log & Allow (block 302), the message is logged (block 304) and then the process follows the same process as if the message were allowed (block 306). If the action is Allow (block 306), then the message is sent to the internal OBD-II Port (block 308). The process then asks if the vehicle status is expired (block 314). If the answer if no, the process waits until another message is received on the external port (block 294). If the answer is yes, the process sends a status received message on the internal port (block 316) and then waits for the process to receive another message on the external port (block 294). At the same time, the process is continually running a question based on whether there is a vehicle status message (block 320). If the answer is yes, the vehicle status information is updated (block 322) and then the message is sent to the external port (block 324). If the answer is no, then the message is sent to the external port (block 324) without updated vehicle status information (block 322). Regardless of the action, the process then loops until a message is received on the internal port and this message is extracted (block 326). The question (block 320) is then asked again by the process.

Although the disclosure has been described with reference to preferred embodiments, persons skilled in the art will recognize that changes may be made in form and detail without departing from the spirit and scope of the disclosed apparatus, systems and methods.

What is claimed is:

1. A protection system for a vehicle comprising at least one vehicle bus in electronic communication with a critical electronic control unit and a non-critical electronic control unit, the protection system comprising:
   (a) a firewall configured to communicate with the critical electronic control unit, the non-critical electronic control unit, and the at least one vehicle bus; and
   (b) a memory in communication with the firewall, the memory storing a set of filtering rules,
   wherein the firewall is configured to:
   (i) periodically send vehicle bus messages to the critical and non-critical electronic control units to determine a state of the vehicle;
   (ii) receive response messages from the critical and non-critical electronic control units in response to the vehicle bus messages;
   (iii) monitor the received response messages to determine the state of the vehicle; and
   (iv) receive and filter data packets sent by the critical and non-critical electronic control units using the set of filtering rules and the state of the vehicle.

2. The protection system of claim 1, wherein the firewall is configured to send vehicle bus messages to the critical and non-critical electronic control units between 1 and 10 times per second.

3. The protection system of claim 2, wherein the state of the vehicle is based on at least one of current vehicle speed, vehicle gear status, and braking status.

4. The protection system of claim 3, wherein the set of filtering rules comprises rules for at least BLOCK, ALLOW, and LOG.

5. The protection system of claim 4, wherein the firewall is configured to prevent a data packet from being sent to the critical or non-critical electronic control units if the firewall applies the rule for BLOCK.

6. The protection system of claim 5, wherein the firewall is configured to send a data packet to the critical or non-critical electronic control units if the firewall applies the rule for ALLOW.

7. The protection system of claim 6, wherein the firewall is configured to send a data packet to the critical or non-critical electronic control units and log the sending if the firewall applies the rule for LOG.

8. A protection system for a vehicle with a vehicle bus and at least one electronic control unit, the protection system comprising:
   (a) a vehicle bus bridge configured to communicate with the vehicle bus and the at least one electronic control unit;
   (b) a firewall in communication with the vehicle bus bridge; and
   (c) memory in communication with the firewall, the memory storing a first set of filtering rules and a second set of filtering rules,
   wherein,
   (1) the firewall is configured to send messages to the at least one electronic control unit to determine a state of the vehicle,
   (2) the vehicle bus bridge is configured to perform bi-directional filtering based upon the first and second set of filtering rules and the state of the vehicle, and
   (3) the first set of filtering rules is used for vehicle bus messages being sent from a critical vehicle bus to a non-critical vehicle bus and the second set of filtering rules is used for vehicle bus messages being sent from a non-critical vehicle bus to a critical vehicle bus.

9. The protection system of claim 8, wherein the firewall is configured to send messages to the at least one electronic control unit to determine the state of the vehicle at least about every second.

10. The protection system of claim 8, wherein the state of the vehicle is based on at least one of gear status, braking status, and vehicle speed.

11. The protection system of claim 8, wherein the firewall comprises at least three filtering actions including BLOCK, ALLOW, and LOG.

12. The protection system of claim 8, wherein the firewall and the memory are part of the vehicle bus bridge.

13. The protection system of claim 12, wherein the firewall is a first firewall and the bus bridge further comprises a second firewall, wherein the first firewall is configured to filter the vehicle bus messages sent from the critical vehicle bus to the non-critical vehicle bus using the first set of filtering rules, and wherein the second firewall is configured to filter the vehicle bus messages sent from the non-critical vehicle bus to the critical vehicle bus using the second set of filtering rules.

14. The protection system of claim 1, wherein the data packets comprise message IDs, and wherein the set of filtering rules defines an action for each combination of vehicle state and message ID.

15. The protection system of claim 14, wherein the set of filtering rules defines different actions for different vehicle states for at least one message ID.

16. The protection system of claim 14, wherein the state of the vehicle is one of a group of vehicle states comprising PARKED, STOPPED, and MOVING.

17. The protection system of claim 8, wherein the vehicle bus messages comprise message IDs, and wherein the set of filtering rules defines an action for each combination of vehicle state and message ID.

18. The protection system of claim 17, wherein the first set of filtering rules defines different actions for different vehicle states for at least one message ID and wherein the second set of filtering rules defines different actions for different vehicle states for at least one message ID.

19. The protection system of claim 17, wherein the state of the vehicle is one of a group of vehicle states comprising PARKED, STOPPED, and MOVING.

20. A method for securing a vehicle on a first firewall, comprising:
   sending vehicle bus messages from the first firewall to at least one electronic control unit;
   receiving, from the at least one electronic control unit, response messages comprising vehicle state information;
   filtering messages on the first firewall using at least a first set of filtering rules, a second set of filtering rules, and the vehicle state information where the first set of filtering rules is used for vehicle bus messages being sent from a critical vehicle bus to a non-critical vehicle bus and the second set of filtering rules is used for vehicle bus messages being sent from a non-critical vehicle bus to a critical vehicle bus; and
   sending approved vehicle bus response messages to a vehicle bus.

* * * * *